United States Patent [19]
Nestegard et al.

[11] Patent Number: 5,936,770
[45] Date of Patent: *Aug. 10, 1999

[54] DUAL ORIENTATION RETROREFLECTIVE SHEETING

[75] Inventors: Susan K. Nestegard; Gerald M. Benson, both of Woodbury; Cheryl M. Frey, White Bear Lake; John C. Kelliher; James E. Lasch, both of Oakdale; Kenneth L. Smith, White Bear Lake; Theodore J. Szczech, Woodbury, all of Minn.

[73] Assignee: 3M Innovative Properties Company, St. Paul, Minn.

[ * ] Notice: This patent is subject to a terminal disclaimer.

[21] Appl. No.: 08/887,006

[22] Filed: Jul. 2, 1997

Related U.S. Application Data

[63] Continuation-in-part of application No. 08/587,719, Jan. 19, 1996, Pat. No. 5,706,132.

[51] Int. Cl.[6] .................................................. G02B 5/124
[52] U.S. Cl. ............................................. 359/530; 359/529
[58] Field of Search ...................................... 359/529, 530

[56] References Cited

U.S. PATENT DOCUMENTS

| | | |
|---|---|---|
| 2,310,790 | 2/1943 | Jungerson . |
| 2,380,447 | 7/1945 | Jungerson . |

(List continued on next page.)

FOREIGN PATENT DOCUMENTS

| | | | |
|---|---|---|---|
| 0 137 736 A2 | 4/1985 | European Pat. Off. ........ | G02B 5/124 |
| 0 175 031 A1 | 3/1986 | European Pat. Off. ........ | G02B 5/124 |
| 0 200 521 A3 | 11/1986 | European Pat. Off. ........ | G02B 5/124 |
| 0 382 420 A2 | 8/1990 | European Pat. Off. ........ | B29C 35/08 |
| 0 478 178 A1 | 4/1992 | European Pat. Off. . | |
| 1289029 | 2/1962 | France . | |
| 1917292 | 10/1970 | Germany . | |
| 2 317 871 | 10/1974 | Germany ........................ | G02B 5/122 |
| 42 40 680 A1 | 6/1994 | Germany ........................ | G02B 5/124 |
| 441319 | 1/1936 | United Kingdom . | |
| 463304 | 3/1937 | United Kingdom . | |

(List continued on next page.)

OTHER PUBLICATIONS

ASTM D882–75B Standard Methods of Test for Tensile Properties of Thin Plastic Sheeting, 1975 (No Month).
ASTM E808–93B Standard Practice for Describing Retroreflection, 1993 (No Month).
Finster, Schmidt–Clausen, "Optimum Identification of Trucks for Real Traffic Situations, Report on Research Project 1.9103 of the Federal Highways Agency," Apr. 1992.
Leighton, J. et al., "RF Welding of PVC and Other Thermoplastic Compounds," *ANTEC,* 1992, pp. 724–718.
Priola, A. et al., "Proceedings of the XIII International Conference in Organic Coatings Science and Technology," Athens, Greece, Jul. 7–11, 1987, pp. 308–18.
Technical Report No. 9077 of Reflexite Retroreflective Sheeting Product, Nov. 11, 1992.
Technical Report No. 9078 of Reflexite Super Bright Brand Reflective Fabric, May 4, 1993.
Yoder, P.R. Jr., "Study of Light Deviation Errors in Triple Mirrors and Tetrahedral Prisms," *J. Optical Soc. Of America,* vol. 48, No. 7, Jul. 1959, pp. 496–499.

*Primary Examiner*—James Phan
*Attorney, Agent, or Firm*—Stephen C. Jensen

[57] ABSTRACT

A cube corner retroreflective sheeting construction comprising alternating zones of cube corner element arrays disposed at approximately ninety degrees orientations to provide exactly two principal plane of improved retroreflective performance in response to light incident on the sheeting at high entrance angles is disclosed. According to one embodiment the sheeting includes a body layer which has an elastic modulus less than $7 \times 10^8$ pascals and cube corner elements formed from a material which has an elastic modulus greater than $16 \times 10^8$ pascals. According to a second embodiment the sheeting includes an overlay film having two major surfaces and comprising a first polymeric material and a plurality of arrays of substantially independent cube corner elements bonded to a major surface of the overlay film having a minimal, fractured land.

48 Claims, 6 Drawing Sheets

U.S. PATENT DOCUMENTS

| | | |
|---|---|---|
| 3,190,178 | 6/1965 | McKenzie . |
| 3,450,459 | 6/1969 | Haggerty . |
| 3,632,695 | 1/1972 | Howell ................................ 264/1 |
| 3,684,348 | 8/1972 | Rowland . |
| 3,689,346 | 9/1972 | Rowland ........................... 156/245 |
| 3,700,305 | 10/1972 | Bingham . |
| 3,712,706 | 1/1973 | Stamm . |
| 3,810,804 | 5/1974 | Rowland ........................... 156/245 |
| 3,811,983 | 5/1974 | Rowland ........................... 156/245 |
| 3,830,682 | 8/1974 | Rowland ............................. 161/2 |
| 3,873,184 | 3/1975 | Heenan . |
| 3,924,929 | 12/1975 | Holmen et al. . |
| 3,926,402 | 12/1975 | Heenan ............................. 249/117 |
| 3,935,359 | 1/1976 | Rowland ........................... 428/172 |
| 3,992,080 | 11/1976 | Rowland . |
| 4,025,159 | 5/1977 | McGrath . |
| 4,066,236 | 1/1978 | Lindner ............................. 249/160 |
| 4,066,331 | 1/1978 | Lindner . |
| 4,095,773 | 6/1978 | Lindner ............................. 249/117 |
| 4,202,600 | 5/1980 | Burke et al. . |
| 4,243,618 | 1/1981 | Van Arnam ........................... 264/1 |
| 4,332,847 | 6/1982 | Rowland ........................... 428/156 |
| 4,349,598 | 9/1982 | White ............................... 428/161 |
| 4,414,316 | 11/1983 | Conley ............................. 430/496 |
| 4,486,363 | 12/1984 | Pricone et al. ..................... 264/1.4 |
| 4,555,161 | 11/1985 | Rowland . |
| 4,576,850 | 3/1986 | Martens ............................ 428/156 |
| 4,582,885 | 4/1986 | Barber .............................. 528/28 |
| 4,588,258 | 5/1986 | Hoopman . |
| 4,601,861 | 7/1986 | Pricone et al. ..................... 264/1.6 |
| 4,668,558 | 5/1987 | Barber ............................. 428/156 |
| 4,775,219 | 10/1988 | Appeldorn . |
| 4,801,193 | 1/1989 | Martin . |
| 4,895,428 | 1/1990 | Nelson et al. . |
| 4,938,563 | 7/1990 | Nelson et al. . |
| 5,066,098 | 11/1991 | Kult et al. ........................ 359/540 |
| 5,077,117 | 12/1991 | Harper et al. ...................... 428/143 |
| 5,117,304 | 5/1992 | Huang et al. ....................... 359/529 |
| 5,138,488 | 8/1992 | Szczech ............................ 359/529 |
| 5,175,030 | 12/1992 | Lu et al. ........................... 428/30 |
| 5,182,663 | 1/1993 | Jones ............................... 359/70 |
| 5,183,597 | 2/1993 | Lu ................................. 264/1.4 |
| 5,189,553 | 2/1993 | Smith .............................. 359/530 |
| 5,213,872 | 5/1993 | Pricone et al. ..................... 428/195 |
| 5,229,882 | 7/1993 | Rowland ............................ 359/530 |
| 5,236,751 | 8/1993 | Martin et al. ....................... 428/40 |
| 5,264,063 | 11/1993 | Martin ............................. 156/247 |
| 5,272,562 | 12/1993 | Coderre ............................ 359/529 |
| 5,300,263 | 4/1994 | Hoopman et al. ..................... 264/2.5 |
| 5,376,431 | 12/1994 | Rowland ............................ 428/164 |
| 5,450,235 | 9/1995 | Smith et al. ....................... 359/529 |
| 5,557,836 | 9/1996 | Smith et al. ....................... 29/527.4 |
| 5,564,870 | 10/1996 | Benson et al. ...................... 409/131 |
| 5,565,151 | 10/1996 | Nilsen ............................. 264/1.1 |
| 5,706,132 | 1/1998 | Nestegard et al. ................... 359/529 |

FOREIGN PATENT DOCUMENTS

| | | | |
|---|---|---|---|
| 2 245 219 | 1/1992 | United Kingdom ............ B32B 3/30 |
| WO 92/04647 | 3/1992 | WIPO ............................ G02B 5/124 |
| WO 94/19711 | 9/1994 | WIPO ............................ G02B 5/124 |
| WO 95/03558 | 2/1995 | WIPO ............................ G02B 5/124 |
| WO 95/07179 | 3/1995 | WIPO ............................ B32B 27/08 |
| WO 95/11466 | 4/1995 | WIPO ............................ G02B 5/124 |
| WO 95/11471 | 4/1995 | WIPO ............................ G02B 5/124 |
| WO 96/10197 | 4/1996 | WIPO ............................ G02B 5/124 |
| WO 96/42025 | 12/1996 | WIPO ............................ G02B 5/124 |
| WO 97/27035 | 7/1997 | WIPO . |
| WO 97/45255 | 12/1997 | WIPO ............................ B32B 3/00 |

DUAL ORIENTATION RETROREFLECTIVE SHEETING

This application is a continuation-in-part of U.S. patent application Ser. No. 08/587,719, filed Jan. 19, 1996, U.S. Pat. No. 5,706,132.

FIELD OF THE INVENTION

The present invention relates to retroreflective articles. More particularly, the present invention relates to cube corner retroreflective sheeting which includes alternating zones of cube corner arrays oriented such that their primary planes of entrance angularity are approximately perpendicular to one another.

BACKGROUND OF THE INVENTION

Retroreflective sheeting has the ability to redirect light incident upon a major surface of the sheeting toward its originating source. This unique ability has led to the widespread use of retroreflective sheeting in a wide variety of conspicuity enhancement applications relating to traffic and personal safety marking. Typical examples of uses of retroreflective sheeting include the placement of such sheeting on road signs, traffic cones, and barricades to enhance their conspicuity, particularly under poor lighting conditions such as, for example, night-time driving conditions or in conditions of inclement weather. These uses typically allow the sheeting to be adhered to relatively flat, rigid surfaces, thereby allowing the sheeting to be relatively inflexible. Additionally, signing applications are characterized by relatively predictable, standardized viewing geometries.

There are essentially two types of retroreflective sheeting: beaded sheeting and cube corner sheeting. Beaded sheeting employs a multitude of independent glass or ceramic microspheres to retroreflect incident light. From an optics perspective, beaded sheeting typically exhibits strong rotational symmetry and entrance angularity performance because of the symmetrical nature of the beads. However, beaded sheeting tends to exhibit relatively low brightness when compared to cube corner sheeting. Additionally, beaded sheeting typically exhibits relatively good flexibility because the beads are independent from one another.

Cube corner retroreflective sheeting typically employs an array of rigid, interconnected cube corner elements to retroreflect light incident on a major surface of the sheeting. The basic cube corner element, now well known in the retroreflective arts is a generally tetrahedral structure having three mutually substantially perpendicular lateral faces which intersect at a single reference point, or apex, and a base triangle opposite the apex. The symmetry axis, or optical axis, of the cube corner element is the axis which extends through the cube apex and trisects the internal space of the cube corner element. In conventional cube corner elements which have an equilateral base triangle, the optical axis of the cube corner element is perpendicular to the plane which contains the base triangle. In operation, light incident on the base of the cube corner element is reflected from each of the three lateral faces of the element and is redirected toward the light source. Retroreflective sheeting generally incorporates a structured surface including at least one array of cube corner reflective elements to enhance the visibility of an object. When compared with beaded sheeting, cube corner retroreflective sheeting exhibits relatively greater brightness in response to light incident at relatively low entrance angles (e.g. near normal light). However, cube corner retroreflective sheeting also exhibits relatively poor entrance angularity and rotational symmetry performance. Additionally, cube corner retroreflective sheeting is typically stiffer than beaded sheeting because the cube corner elements are all interconnected.

The optics of cube corner retroreflective sheeting may be designed to exhibit optimal performance at a specific orientation. This may be accomplished by forming the cube corner elements of the retroreflective sheeting such that their optical axes are canted relative to an axis perpendicular to the base plane of the sheeting. For example, U.S. Pat. No. 4,588,258 to Hoopman (the '258 patent) discloses retroreflective sheeting which employs optics having canted cube corner elements which form opposing matched pairs. The sheeting disclosed in the '258 exhibits a primary plane of improved retroreflective performance at high entrance angles, identified as the x-plane in the '258 patent, and a secondary plane of improved retroreflective performance at high entrance angles, identified as the y-plane in the '258 patent. In use, it is recommended that sheeting manufactured in accordance with the '258 patent be oriented such that its principal plane of improved retroreflective performance (e.g. the x-plane) is coincident with an expected entrance plane. Thus, sheeting in accordance with the '258 patent has a single preferred orientation.

Many conspicuity applications could benefit from a retroreflective sheeting which exhibits two primary planes of improved retroreflective performance at relatively high entrance angles. For example, some signing applications may benefit because a second primary plane of improved retroreflective performance at high entrance angles would provide a second preferred orientation for placing sheeting on road signs. A second preferred orientation should result in increased efficiency and reduced waste in the sign construction process.

A second application which could benefit from retroreflective sheeting having two primary planes of improved retroreflective performance at high entrance angles is the field of vehicle conspicuity marking, and especially the field of truck conspicuity marking. Many accidents involving trucks are side-on collisions which occur in poor lighting conditions because an oncoming vehicle cannot see a truck crossing its path in time to avoid the accident. Studies have shown that appropriate truck conspicuity marking programs can significantly reduce the incidence of such side-on collisions. See, e.g. Finster, Schmidt-Clausen, *Optimum Identification of Trucks for Real Traffic Situations, Report on Research Project* 1.9103 *of the Federal Highways Agency*, April, 1992. The United States has implemented a regulation relating to retroreflective conspicuity enhancement systems for commercial vehicles. It is known that other countries are pursuing relations governing full contour markings on long and heavy vehicles through the UN/ECE.

Full contour marking of commercial vehicles (e.g. marking the entire perimeter of a vehicle's side and/or rear walls) allows viewers to determine the full dimensions of the vehicle. However, full contour marking requires that retroreflective sheeting be placed in both a horizontal orientation (e.g. along the bottom and/or top of a vehicle) and in a vertical orientation (e.g. along the side of a vehicle). It would be desirable to provide a single retroreflective sheeting product which performs equally well in either orientation such that it could be placed on a vehicle in either a vertical or a horizontal orientation. The sheeting optics should provide strong retroreflective performance in two perpendicular planes. From a physical perspective, truck conspicuity applications require the sheeting to be adhered to the side of a vehicle which may include corrugations and/or protruding rivets or which may be made from a flexible tarpaulin. Accordingly, the sheeting should be able to conform to underlying surfaces which are irregular or flexible.

BRIEF SUMMARY OF THE INVENTION

Briefly, the present invention provides retroreflective sheeting which has been designed to exhibit optimal retroreflective performance at high entrance angles in two perpendicular orientations. Retroreflective sheeting in accordance with principles of the present invention includes a substrate having a base surface and a structured surface opposite the base surface. The structured surface defines a plurality of zones of cube corner retroreflective elements, including at least one first zone comprising an array of optically opposing cube corner elements and at least one second zone comprising an array of optically opposing cube corner elements. The optical axes of opposing cube corner elements in the first zone are canted to define a first primary plane of improved retroreflective performance at increased entrance angles and the optical axes of the opposing cube corner elements in the second zone are canted to define a second primary plane, perpendicular to the first primary plane, of improved retroreflective performance at increased entrance angles. Advantageously, retroreflective sheeting manufactured in accordance with principles of this invention exhibits substantially similar retroreflective performance in response to light incident on said sheeting at varying entrance angles in either the first plane or the second plane.

In a preferred embodiment of sheeting in accordance with the present invention, the array of cube corner elements in the first zone is oriented such that the first primary plane of improved retroreflective performance lies substantially perpendicular to an edge of the sheeting and the array of cube corner elements in the second zone is oriented such that the second primary plane of improved retroreflective performance lies substantially parallel with the same edge of the sheeting. Even more preferably, retroreflective sheeting in accordance with the present invention comprises a plurality of alternating zones of cube corner element arrays, approximately one-half of which are oriented such that their primary plane of improved retroreflective performance is perpendicular to a longitudinal edge of the sheeting and the remaining zones are oriented such that their primary plane of improved retroreflective performance is parallel to the longitudinal edge of the sheeting. Retroreflective sheeting in accordance with this embodiment is particularly well adapted for use in either of two perpendicular orientations.

Figure 2:
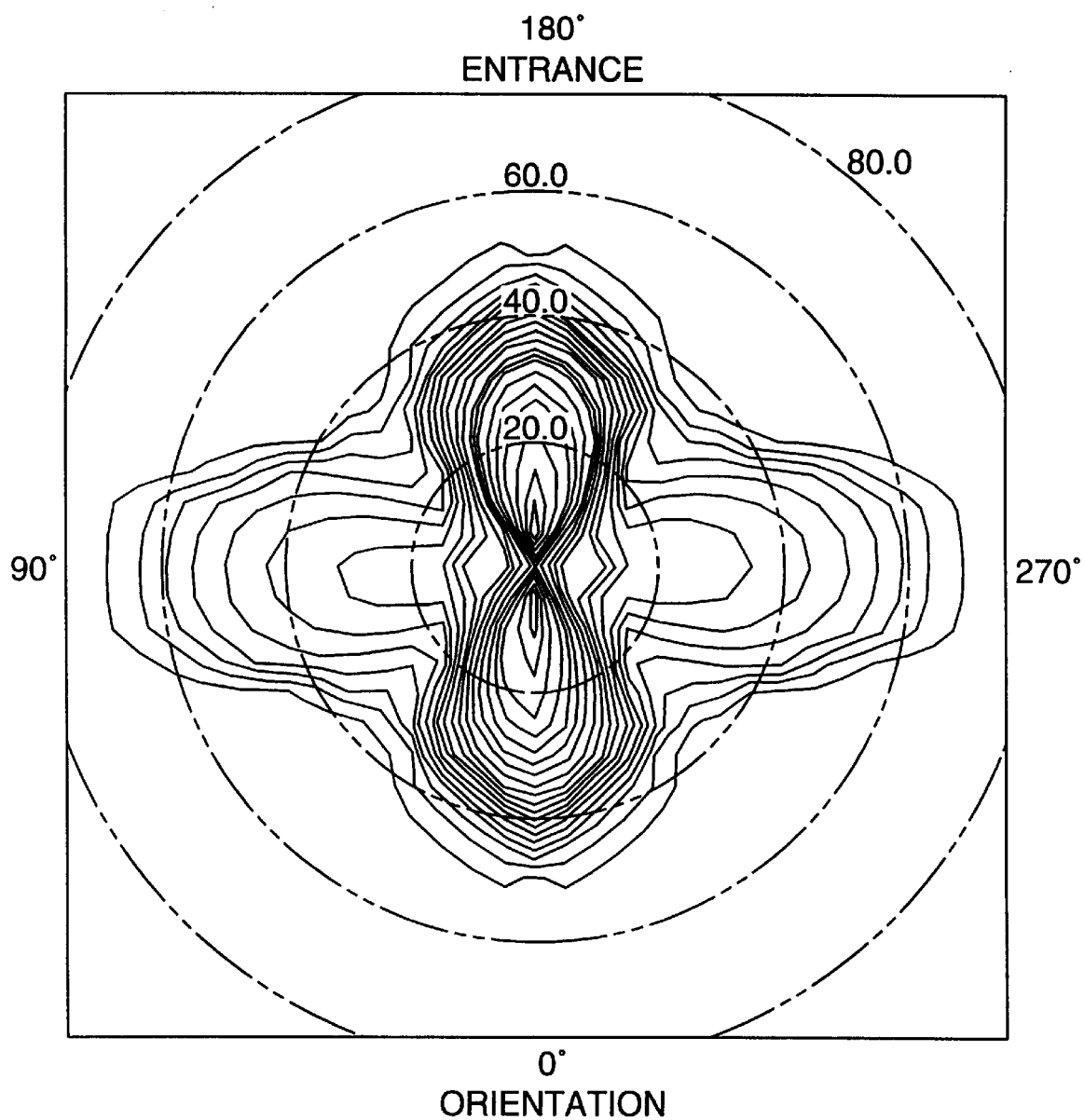
FIG. 2 is an isobrightness graph which represents the retroreflective performance of a sample of retroreflective sheeting manufactured in accordance with the prior art.
Figure 3:
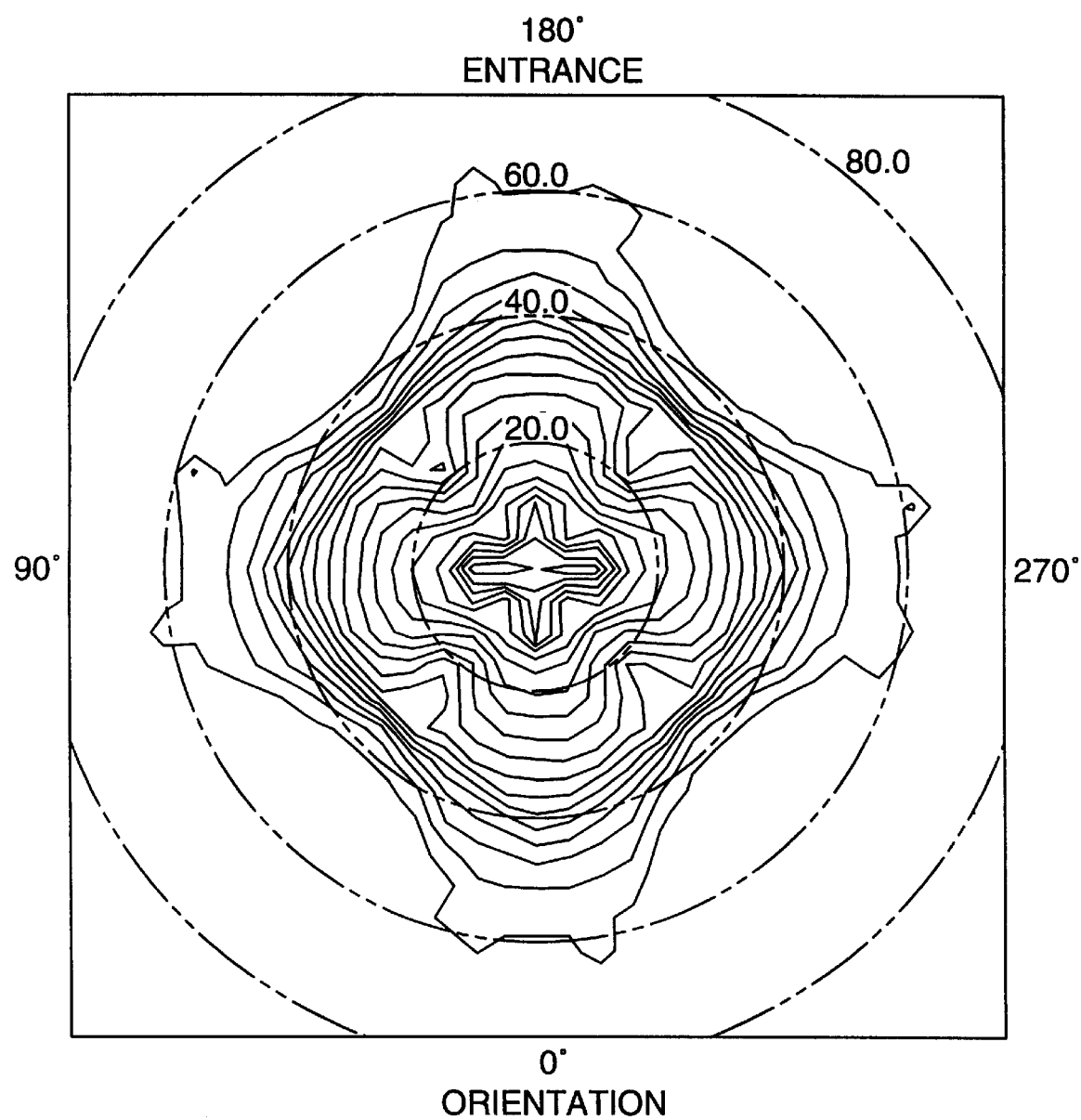
FIG. 3 is an isobrightness graph which represents the retroreflective performance of a sample of retroreflective sheeting manufactured in accordance with the present invention.

These figures, which except for FIG. 2 and FIG. 3, are idealized and not to scale, are intended to be merely illustrative and non-limiting.

DETAILED DESCRIPTION OF THE PREFERRED EMBODIMENTS

In describing preferred embodiments of the invention, specific terminology will be used for the sake of clarity. The invention, however, is not intended to be limited to the specific terms so selected, and it is to be understood that each term so selected includes all technical equivalents that operate similarly.

According to the present invention, a cube corner retroreflective sheeting 10 is provided which exhibits improved retroreflective performance at high entrance angles in exactly two primary planes. Furthermore, the sheeting exhibits substantially similar retroreflective performance at varying entrance angles in each of the two primary planes. Therefore, in use the sheeting may be oriented in either of two preferred orientations, rather than in a single preferred orientation as is common with many types of retroreflective sheeting. To accomplish these optics, the structured surface of the sheeting includes at least two zones of cube corner element arrays. Each zone includes an array of optically opposing cube corner retroreflective elements in which the optical axes are canted to define a primary plane of improved retroreflective performance at high entrance angles. The optical axes of the cube corner retroreflective elements in the first zone are canted in a first plane to define a first primary plane of improved entrance angularity. The optical axes of the cube corner elements in the second zone are canted in a second plane to define a second primary plane of improved entrance angularity. By arranging the arrays on the sheeting such that the first primary plane of entrance angularity is perpendicular to the second primary plane of entrance angularity, two primary planes of improved retroreflective performance may be established.

Figure 1:
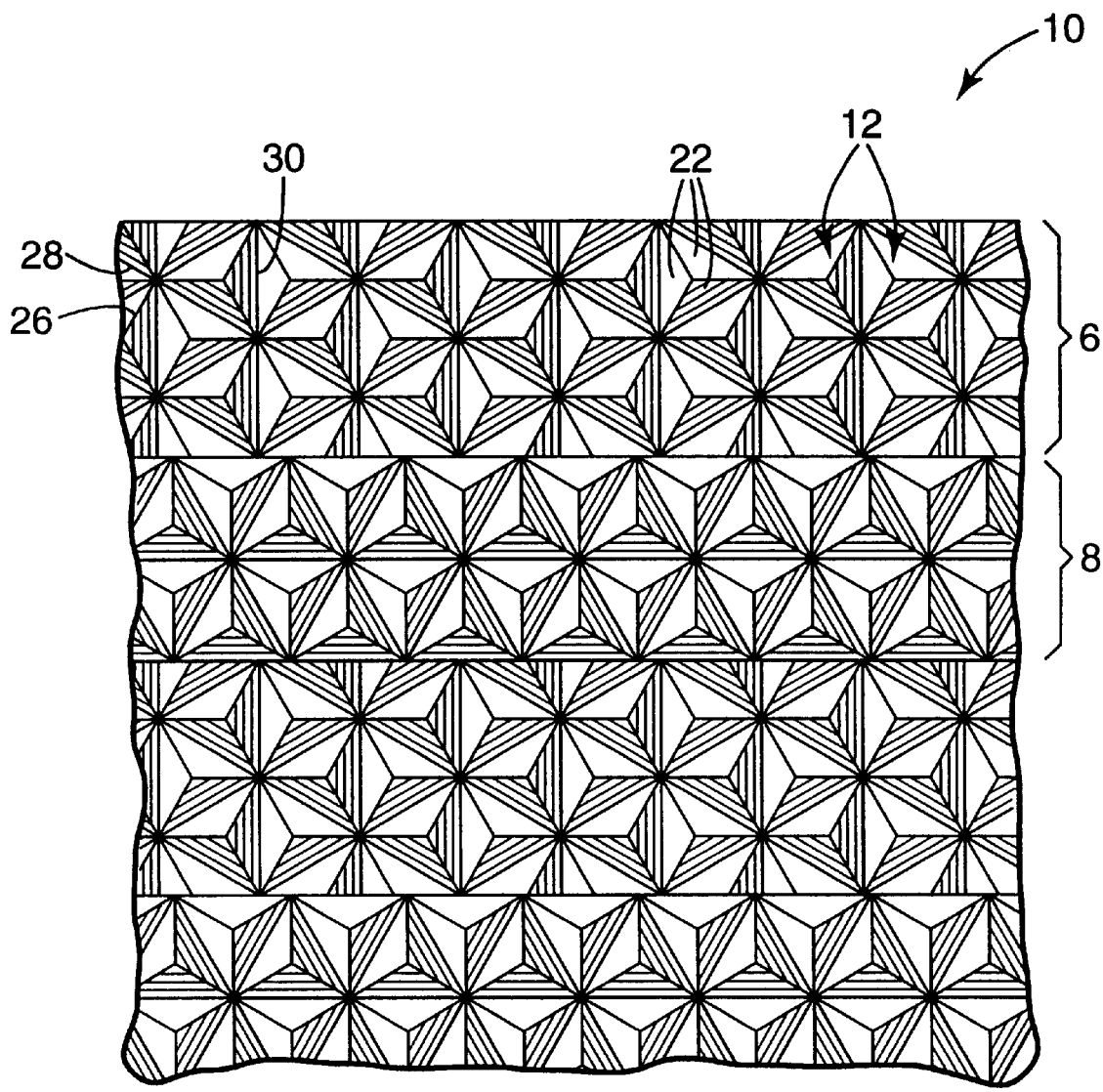
FIG. 1 is a plan view illustrating the structured surface of one embodiment of retroreflective sheeting in accordance with principles of the present invention.

FIG. 1 depicts a magnified view of a portion of the structured surface of a retroreflective sheeting in accordance with principles of the present invention. Referring to FIG. 1, the structured surface includes a plurality of alternating zones which comprise an array of cube corner elements 12. As shown, the cube-corner elements 12 are disposed as optically opposing matched pairs in an array on one side of the sheeting. Each cube-corner element 12 has the shape of a trihedral prism with three exposed planar faces 22. The dihedral angle between the cube corner element faces 22 typically is the same for each cube-corner element in the array measures about 90°. The angle, however, can deviate slightly from 90° as is well-known; see, for example, U.S. Pat. No. 4,775,219 to Appledorn et al. Additionally, while a preferred cube corner geometry is disclosed in U.S. Pat. No. 4,588,258, incorporated herein by reference, insubstantial changes in the cube corner geometry calculated to produce substantially the same retroreflection profile are considered within the scope of the present invention. Canting opposing cube corner elements at an angle with respect to an axis which is perpendicular to the base surface of the sheeting defines a single primary plane of improved retroreflective performance at high entrance angles and a single secondary plane of improved retroreflective performance at high entrance angles.

The axes can be canted in a direction commonly referred to in the art as a 'backward' or 'negative' direction as discussed in U.S. Pat. No. 5,565,151 (Nilsen) or in a 'forward', or 'positive' direction as disclosed in U.S. Pat. No. 4,588,258 (Hoopman). Backward canted cube corner elements may be further characterized in that only one included angle of the cube corner element base triangle measures less than 60°. The other two included angles measure at least 60°. Backward canted cubes can be configured to have two, substantially similar preferred planes of entrance angularity. The two similar planes of entrance angularity may or may not be perpendicular with respect to each other. By contrast, forward canted cubes can be characterized in that two of the included angles of the base triangle measure less than 60° and a single base triangle included angle measures greater than 60°. It will be understood that the particular geometry discussed herein relate to a preferred embodiment. One of ordinary skill in the optical arts will understand that varying degrees of canting and varying cube sizes can be used in accordance with this disclosure.

The structural surface of sheeting 10 comprises a plurality of alternating zones of cube corner arrays disposed at approximately ninety degree orientations. Accordingly, sheeting 10 may be characterized in that it includes a first zone 6 including an array of cube corner elements disposed in a first orientation on the sheeting and a second zone 8 of cube corner elements disposed in a second orientation on the sheeting to define a first primary plane of improved retroreflective performance at high entrance angles and a second primary plane of improved retroreflective performance at high entrance angles which is perpendicular to the first plane.

In the embodiment depicted in FIG. 1 first zone 6 extends substantially parallel with a longitudinal edge of sheeting 10. First zone 6 includes an array of cube corner elements 12 formed by three mutually intersecting sets of grooves including two secondary groove sets 26, 28 and a primary groove set 30. The individual cube corner elements 12 in the array are formed such that their optical axes are canted in a plane perpendicular to primary groove 30. Accordingly, the cube corner array in first zone 6 exhibits a primary plane of improved retroreflective performance which extends perpendicular to primary groove 30 and perpendicular to the longitudinal edge of the sheeting 10. In the disclosed embodiment, the individual cube corner elements are canted through an angle of approximately 8.15 degrees with respect to an axis normal to the base of the cube corner element to define base triangle included angles of 55.5 degrees, 55.5 degrees, and 69 degrees. Further, the cube corner elements measure about 88.9 microns in height. Second zone 8 extends substantially parallel to first zone 6 along the length of sheeting and includes an array of cube corner elements 12 substantially identical to the array disposed in first zone 6, however the array in second zone is disposed at a ninety degree orientation relative to the array in first zone 6. In general, the advantages of the present invention may be obtained by canting opposing cube corner element through an angle between about 7 degrees and about 15 degrees. See, e.g., U.S. Pat. No. 4,588,288. It will be understood that the particular geometries discussed in this paragraph relate to a preferred embodiment of the present invention. One of ordinary skill in the optical arts will understand that varying degrees of canting and varying cube sizes can be used in accordance with this invention. Insubstantial changes in cube geometries calculated to yield substantially the same optical results should be considered within the scope of the present invention.

FIG. 2 depicts the retroreflective characteristics of retroreflective sheeting which employs optics in accordance with the invention disclosed in U.S. Pat. No. 4,588,258 (the '258 patent). The optics disclosed in the '258 patent exhibits a single principal plane which exhibits improved retroreflective performance at high entrance angles, represented by the plane extending through the two broadest lobes of the isobrightness contours, and a secondary plane, which exhibits improved retroreflective performance at high entrance angles, represented by the plane which extends through the two shorter lobes of the isobrightness contours. Accordingly, in use, sheeting manufacturing in accordance with the '258 patent optics has a single preferred orientation. The present invention overcomes this limitation by providing two planes which exhibit improved retroreflective performance at high entrance angles. As disclosed in PCT Patent Application WO 96/42025, entitled Cube Corner Articles Exhibiting Improved Entrance Angularity in One or More Planes, backward canted cubes may be configured (e.g., base angles of 65°, 65°, 50°) to have two similar preferred planes of entrance angularity. The two preferred planes of entrance angularity are not necessarily perpendicular to each other.

FIG. 3 is an isobrightness contour graph which depicts the retroreflective characteristics of a dual orientation sheeting in accordance with the embodiment disclosed in FIG. 1. Retroreflective brightness readings were taken from a sample of sheeting in accordance with FIG. 1. A detailed description of retroreflective testing geometries and measurement angles is supplied in ASTM E-808-93b, *Standard Practice for Describing Retroreflection,* incorporated herein by reference. Measurements were taken at a fixed observation angle of 0.33 degrees and a fixed presentation angle of 90 degrees. The entrance angle was varied between 0 and 80 degrees and the sheeting was rotated through a 360 degree range of orientation angles. On the graph of FIG. 3, entrance angles are represented by concentric circles while orientation angles are represented by numerals extending radially around the graph. The concentric isobrightness contours represent the relative retroreflectance of the retroreflected light; the maximum retroreflectance is represented by the center point on the graph and concentric isobrightness contours representing five percent reductions in retroreflectance relative to the maximum, measured in a candeles/lux/meter$^2$.

Referring to FIG. 3, retroreflective sheeting in accordance with the present invention exhibits exactly four broad lobes of improved retroreflective performance at high entrance angles. These four lobes occur at 90 degree intervals beginning at a zero degree orientation angle (e.g. at 0, 90, 180, and 270 degrees orientation angle). These four lobes define two primary planes of improved retroreflective performance at high entrance angles: the first plane extends through the plane of the sheeting at a 0–180 orientation and the second plane extends through the sheeting at a 90–270 orientation. Moreover, the sheeting exhibits substantially similar retroreflective performance across varying entrance angles within these two planes. For example, the retroreflectance of the retroreflected light is approximately five percent of the maximum retroreflectance at an entrance angle of 60 degrees and an orientation angle of either 0, 90, 180, or 270 degrees. Similarly, the retroreflectance of the retroreflected light is approximately thirty percent of the maximum retroreflectance at an entrance angle of 40 degrees and an orientation angle of either 0, 90, 180, or 270 degrees. The maximum retroreflected retroreflectance of the tested sample measured 891.47 candelas/lux/m². Accordingly, the retroreflectance of the retroreflected light measured approximately 267 candelas/lux/m² at a 40 degree entrance angle in any of these four planes and approximately 45 candelas/lux/m² at a 60 degree entrance angle in any of these four planes. It is believed that the retroreflective performance of sheeting in accordance with the present invention substantially outperforms existing retroreflective sheeting at high entrance angle in these four orientation angles. Accordingly, in use the sheeting may be oriented in either of two different orientations to enable the sheeting to provide optimal retroreflective performance.

Referring again to FIG. 1, a preferred embodiment of sheeting in accordance with the present invention comprises a plurality of alternating zones of cube corner elements. Generally, it is desirable that a viewer at a distance of greater than about 100 meters from the sheeting perceives a substantially uniform brightness retroreflected from the sheeting in response to light incident on the sheeting at relatively high entrance angles. Testing has demonstrated that zones which measure between about 3 millimeters and 25 millimeters in width fulfill this requirement. In a preferred embodiment, the zones measure about 8 millimeters in width and extend longitudinally along the length of the sheeting. However, it will be appreciated by one of ordinary skill in the art that zones may be of a shape other than the longitudinal in extending zones disclosed in FIG. 1.

Sheeting in accordance with the present invention may be manufactured using conventional methods well known in the cube corner retroreflective sheeting arts. Briefly, according to one method a mold of the structured surface is made using a precision machining tool such as a diamond cutting tool. A master mold which includes a positive image of the structured surface is formed by cutting a first groove set into a machinable substrate, typically aluminum or copper, using a tool having an approximately 86.8 degree included angle. The substrate is then rotated through an angle of approximately 55.5 degrees and a second groove set is cut using a tool which has an included angle of approximately 61.8 degrees. Finally, the substrate is rotated through an angle of approximately 124.5 degrees and a third groove set is cut using a tool which has an included angle of approximately 61.8 degrees. This process forms a master mold having a positive image of a cube corner surface in which the cube corner element base triangles measure approximately 55.5, 55.5, and 69 degrees.

The mold may then be replicated using a conventional replication process such as an electroforming process. Replicas of the mold are then sliced into thin strips using a precision cutting tool. The strips are then rearranged to form a mold which has a negative image corresponding to the structured surface depicted in FIG. 1. This mold may then be used to manufacture retroreflective sheeting or may be passed through additional replication steps to form additional molds.

Figure 4:
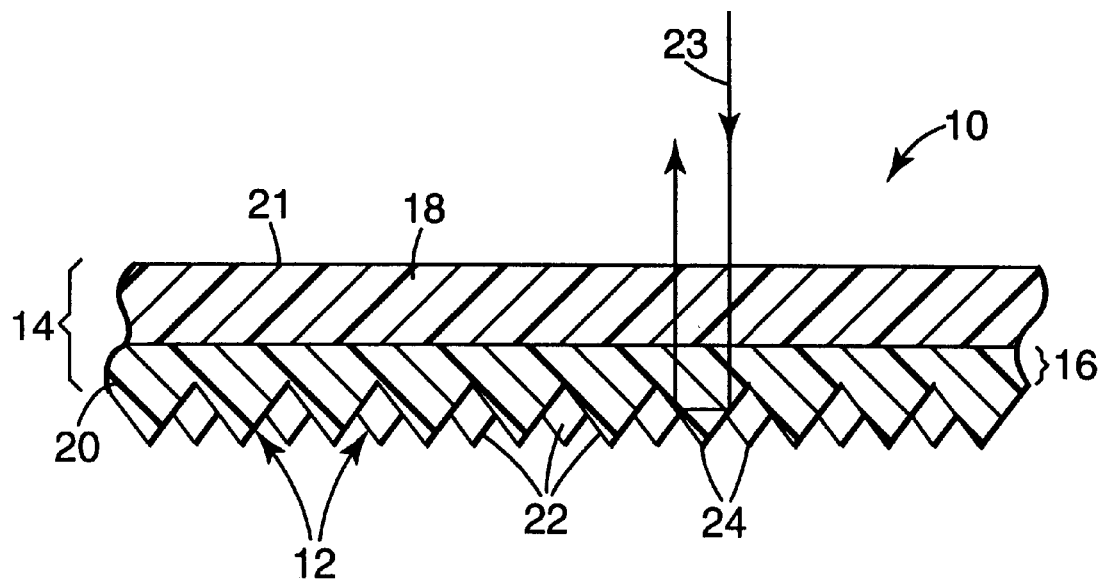
FIG. 4 is a cross-sectional view of one embodiment of retroreflective sheeting in accordance with principles of the present invention.

FIG. 4 is a cross-sectional view of one embodiment of retroreflective sheeting in accordance with principles of the present invention. The embodiment depicted in FIG. 4 is specifically designed to be a flexible retroreflective sheeting as disclosed in U.S. Pat. No. 5,450,235, incorporated herein by reference. In the practice of the present invention, a cube-corner retroreflective sheeting is provided which maintains good dimensional stability and high degrees of retroreflectance under highly flexed conditions. In FIG. 4, there is shown an example of a cube-corner retroreflective sheeting in accordance with the present invention which comprises a multitude of cube-corner elements 12 and a substrate, or body portion 14. The body portion 14 can include a land layer 16 and a body layer 18. The body layer typically functions to protect the sheeting from environmental elements and/or to provide significant mechanical integrity to the sheeting. In a preferred embodiment, the body layer 18 is the outermost layer on the front side of the sheeting 10. The land layer 16 is distinguished from the body layer 18 by being a layer disposed immediately adjacent to the base of the cube-corner elements, and the term "land layer" is used herein to mean such a layer.

The cube-corner elements 12 project from a first or rear side 20 of body portion 14. The cube-corner elements 12 comprise a light transmissible polymeric material having an elastic modulus greater than $16 \times 10^8$ pascals, and the body layer 18 comprises a light transmissible polymeric material having an elastic modulus less than $7 \times 10^8$ pascals. Light enters the cube-corner sheeting 10 through the base surface 21. The light then passes through the body portion 14 and strikes the planar faces 22 of the cube-corner elements 12 and returns in the direction from which it came as shown by arrow 23.

Predicted total light return (TLR) for a cube corner matched pair array can be calculated from a knowledge of percent active area and ray intensity. Ray intensity may be reduced by front surface losses and by reflection from each of the three cube corner surfaces for a retroreflected ray. Total light return is defined as the product of percent active area and ray intensity, or a percentage of the total incident light which is retroreflected. A discussion of total light return for directly machined cube corner arrays is presented in U.S. Pat. No. 3,712,706 (Stamm).

In a preferred construction, the cube-corner elements 12 and land layer 16 are made from similar or the same kind of polymers, and the land layer 16 is kept to a minimal thickness. The land layer 16, typically, has a thickness in the range of about 0 to 150 micrometers, and preferably in the range of approximately about 1 to 100 micrometers. Body layer 18 typically has a thickness of approximately 20 to 1,000 micrometers, and preferably in the range of about 50 to 250 micrometers. Although it is preferred to keep the land layer to a minimum thickness, it is desired that the sheeting 10 possess some land layer 16 so that a flat interface can be provided between the land layer 16 and the body layer 18. The cube-corner elements 12 typically have a height in the range of about 20 to 500 micrometers, and more typically in the range of about 60 to 180 micrometers. Although the embodiment of the invention shown in FIG. 1 has a single body layer 18, it is within the scope of the present invention to provide more than one body layer 18 in the body portion 14.

A specular reflective coating such as a metallic coating (not shown) can be placed on the backside of the cube-corner elements 12 to promote retroreflection by specular reflection. The metallic coating can be applied by known techniques such as vapor depositing or chemically depositing a metal such as aluminum, silver, or nickel. A primer layer may be applied to the backside of the cube-corner elements to promote the adherence of the metallic coating. In addition to or in lieu of a metallic coating, a seal film can be applied to the backside of the cube-corner elements; see, for example, U.S. Pat. Nos. 4,025,159 and 5,117,304. The sealing film maintains an air interface at the backside of the cubes to provide retroreflectivity according to the principles of total internal reflection. A backing and/or an adhesive layer also can be disposed behind the cube-corner elements to enable the cube-corner retroreflective sheeting 10 to be secured to a substrate.

The polymeric materials that compose the cube corner elements and body portion of the retroreflective sheeting of the invention are light transmissible. This means that the polymer is able to transmit at least 70 percent of the intensity of the light incident upon it at a given wavelength. More preferably, the polymers that are used in the retroreflective sheeting of the invention have a light transmissibility of greater than 80 percent, and more preferably greater than 90 percent.

The polymeric materials that are employed in the cube-corner elements are preferably hard and rigid. The polymeric materials may be thermoplastic or crosslinkable resins. The elastic modulus of these polymers preferably is greater than $18 \times 10^8$ pascals, and more preferably is greater than $20 \times 10^8$ pascals.

When thermoplastic polymers are used in the cubes, the glass transition temperature generally is greater than 80° C., and the softening temperature is typically greater than 150° C. Generally, the thermoplastic polymers used in the cube-corner layer are amorphous or semi-crystalline, and the linear mold shrinkage of the polymer preferably is less than one percent.

Illustrative examples of thermoplastic polymers that may be used in the cube-corner elements include acrylic polymers such as poly(methylmethacrylate); polycarbonates; cellulosics such as cellulose acetate, cellulose (acetate-co-butyrate), cellulose nitrate; epoxies; polyesters such as poly (butylene terephthalate), poly(ethylene terephthalate); fluoropolymers such as poly(chlorofluoroethylene), poly (vinylidene fluororide); polyamides such as poly(caprolactam), poly(amino caproic acid), poly (hexamethylene diamine-co-adipic acid), poly(amide-co-imide), and poly(ester-co-imide); polyetherketones; poly (etherimide); polyolefins such as poly(methylpentene); poly (phenylene ether); poly(phenylene sulfide); poly(styrene) and poly(styrene) copolymers such as poly(styrene-co-acrylonitrile), poly(styrene-co-acrylonitrile-co-butadiene); polysulfone; silicone modified polymers (i.e., polymers that contain a small weight percent (less than 10 weight percent) of silicone) such as silicone polyamide and silicone polycarbonate; fluorine modified polymers such as perfluoropoly (ethyleneterephthalate); and mixtures of the above polymers such as a poly(ester) and poly(carbonate) blend, and a fluoropolymer and acrylic polymer blend.

Additional materials suitable for forming the cube-corner elements are reactive resin systems capable of being crosslinked by a free radical polymerization mechanism by exposure to actinic radiation. For example, electron beam, ultraviolet light, or visible is light. Additionally, these materials may be polymerized by thermal means with the addition of a thermal initiator such as benzoyl peroxide. Radiation-initiated cationically polymerizable resins also may be used.

Reactive resins suitable for forming the cube-corner elements may be blends of photoinitiator and at least one compound bearing an acrylate group. Preferably the resin blend contains a difunctional or polyfunctional compound to ensure formation of a crosslinked polymeric network upon irradiation.

Illustrative examples of resins that are capable of being polymerized by a free radical mechanism include acrylic-based resins derived from epoxies, polyesters, polyethers and urethanes, ethylenically unsaturated compounds, aminoplast derivatives having at least one pendant acrylate group, isocyanate derivatives having at least one pendant acrylate group, epoxy resins other than acrylated epoxies, and mixtures and combinations thereof The term acrylate is used here to encompass both acrylates and methacrylates. U.S. Pat. No. 4,576,850 to Martens (disclosure incorporated herein in its entirety by reference) discloses examples of crosslinked resins that may be used in the cube-corner elements of the present invention.

Ethylenically unsaturated resins include both monomeric and polymeric compounds that contain atoms of carbon, hydrogen and oxygen, and optionally nitrogen, sulfur and the halogens. Oxygen or nitrogen atoms or both are generally present in ether, ester, urethane, amide and urea groups. Ethylenically unsaturated compounds preferably have a molecular weight of less than about 4,000 and preferably are esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like.

Some examples of compounds having an acrylic or methacrylic group are listed below. The listed compounds are illustrative and not limiting.

(1) Monofunctional Compounds

Ethylacrylate, n-butylacrylate, isobutylacrylate, 2-ethylhexylacrylate, n-hexylacrylate, n-octylacrylate, isobomyl acrylate, tetrahydrofurfuryl acrylate, 2-phenoxyethyl acrylate, N,N-dimethylacrylamide;

(2) Difunctional Compounds 1,4-butanediol diacrylate, 1,6-hexanediol diacrylate, neopentylglycol diacrylate, ethylene glycol diacrylate, triethyleneglycol diacrylate, and tetraethylene glycol diacrylate;

(3) Polyfunctional Compounds

Trimethylolpropane triacrylate, glyceroltriacrylate, pentaerythritol triacrylate, pentaerythritol tetraacrylate, and tris (2-acryloyloxyethyl)isocyanurate.

Some representative examples of other ethylenically unsaturated compounds and resins include styrene, divinylbenzene, vinyl toluene, N-vinyl pyrrolidone, N-vinyl caprolactam, monoallyl, polyallyl, and polymethallyl esters such as diallyl phthalate and diallyl adipate, and amides of carboxylic acids such as and N,N-diallyladipamide.

Illustrative examples of photopolymerization initiators which can be blended with the acrylic compounds include the following: benzil, methyl o-benzoate, benzoin, benzoin ethyl ether, benzoin isopropyl ether, benzoin isobutyl ether, etc., benzophenone/tertiary amine, acetophenones such as 2,2-diethoxyacetophenone, benzil methyl ketal, 1-hydroxycyclohexyl phenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, 2,4,6-trimethylbenzoyldiphenylphosphine oxide, 2-methyl-1-4-(methylthio)phenyl-2-morpholino-1-propanone, et cetera. These compounds may be used individually or in combination.

Cationically polymerizable materials include but are not limited to materials containing epoxy and vinyl ethers functional groups. These systems are photoinitiated by onium salt initiators such as triarylsulfonium, and diaryliodonium salts.

Preferred polymers for the cube-corner elements include poly(carbonate), poly(methylmethacrylate), poly (ethyleneterephthalate), and crosslinked acrylates such as multi-functional acrylates or epoxies and acrylated urethanes blended with mono- and multi-functional monomers. These polymers are preferred for one or more of the following reasons: thermal stability, environmental stability, clarity, excellent release from the tooling or mold, and capable of receiving a reflective coating.

The polymeric materials employed in the land layer, as indicated above, may be the same as the polymers that are employed in the cube-corner elements, provided that the land layer is kept to a minimal thickness. The land layer preferably is substantially flat so that a better interface is achieved between the cubes and the body layer. Cavities and/or interfacial roughness preferably are avoided between the cubes and land layer so that optimum brightness can be displayed by the retroreflective sheeting when light is retroreflected therefrom. A good interface prevents spreading of retroreflective light from refraction. In most instances, the land layer is integral with the cube-corner elements. By "integral" is meant the land and cubes are formed from a single polymeric material—not two different polymeric layers subsequently united together. The polymers that are employed in the cube-corner elements and land layer can have refractive indices which are different from the body layer. Although the land layer desirably is made of a polymer similar to that of the cubes, the land also may be made from a softer polymer such as those used in the body layer.

The body layer preferably comprises a low elastic modulus polymer for easy bending, curling, flexing, or conforming. The elastic modulus preferably is less than $5 \times 10^8$ pascals, and more preferably is less than $3 \times 10^8$ pascals. Generally, the polymers of the body layer have a glass transition temperature that is less than 50° C. The polymer preferably is such that the polymeric material retains its physical integrity at the temperatures at which it is applied to the cubes. The polymer desirably has a vicate softening temperature that is greater than 50° C. The linear mold shrinkage of the polymer desirably is less than 1 percent. Preferred polymeric materials used in the body layer are resistant to degradation by UV light radiation so that the retroreflective sheeting can be used for long-term outdoor applications. Illustrative examples of polymers that may be employed in the body layer include:

fluorinated polymers such as: poly(chlorotrifluoroethylene), for example Kel-F800™ available from 3M, St. Paul, Minn.; poly(tetrafluoroethylene-co-hexafluoropropylene), for example Exac FEP™ available from Norton Performance, Brampton, Mass.; poly(tetrafluoroethylene-co-perfluoro(alkyl)vinylether), for example, Exac PEA™ also available from Norton Performance; and poly(vinylidene fluoride-co-hexafluoropropylene), for example, Kynar Flex-2800™ available from Pennwalt Corporation, Philadelphia, Pa.;

ionomeric ethylene copolymers such as: poly(ethylene-co-methacrylic acid) with sodium or zinc ions such as Surlyn-8920™ and Surlyn-9910™ available from E.I. duPont Nemours, Wilmington, Del.;

low density polyethylenes such as: low density polyethylene; linear low density polyethylene; and very low density polyethylene;

plasticized vinyl halide polymers such as plasticized poly(vinylchloride);

polyethylene copolymers including: acid functional polymers such as poly(ethylene-co-acrylic acid) and poly(ethylene-co-methacrylic acid) poly(ethylene-co-maleic acid), and poly(ethylene-co-fumaric acid); acrylic functional polymers such as poly(ethylene-co-alkylacrylates) where the alkyl group is methyl, ethyl, propyl, butyl, et cetera, or $CH_3(CH_2)n$— where n is 0–12, and poly(ethylene-co-vinylacetate); and aliphatic and aromatic polyurethanes derived from the following monomers (1)–(3): (1) diisocyanates such as dicyclohexylmethane-4,4'-diisocyanate, isophorone diisocyanate, 1,6-hexamethylene diisocyanate, cyclohexyl diisocyanate, diphenylmethane diisocyanate, and combinations of these diisocyanates, (2) polydiols such as polypentyleneadipate glycol, polytetramethylene ether glycol, polyethylene glycol, polycaprolactone diol, poly-1,2-butylene oxide glycol, and combinations of these polydiols, and (3) chain extenders such as butanediol or hexanediol. Commercially available urethane polymers include: PN-03, or 3429 from Morton International Inc., Seabrook, N.H.

Combinations of the above polymers also may be employed in the body layer of the body portion. Preferred polymers for the body layer include: the ethylene copolymers that contain units that contain carboxyl groups or esters of carboxylic acids such as poly(ethylene-co-acrylic acid), poly(ethylene-co-methacrylic acid), poly(ethylene-co-vinylacetate); the ionomeric ethylene copolymers; plasticized poly(vinylchloride); and the aliphatic urethanes. These polymers are preferred for one or more of the following reasons: suitable mechanical properties, good adhesion to the land layer, clarity, and environmental stability.

In an embodiment that contains polycarbonate cube-corner elements and/or a polycarbonate land layer and a body layer that contains a polyethylene copolymer such as poly(ethylene-co-(meth)acrylic acid), poly(ethylene-co-vinylacetate) or poly(ethylene-co-acrylate), the interfacial adhesion between the body layer and the land layer or cube-corner elements can be improved by placing a thin tie-layer (not shown) therebetween. The tie-layer can be applied on the body layer before laminating the body layer to the land layer or to the cube-corner elements. The tie-layer can be applied as a thin coating using, for example: an aliphatic polyurethane in organic solution, for example Permuthane™ U26-248 solution, available from Permuthane Company, Peabody, Mass.; Q-thane™ QC-4820 available from K.J. Quinn and Co., Inc., Seabrook, N.H.; an aliphatic polyurethane waterborne dispersion, for example NeoRez™ R-940, R-9409, R-960, R-962, R-967, and R-972, available from ICI Resins US, Wilmington, Mass.; an acrylic polymer water borne dispersion, for example, NeoCryl™ A-601, A-612, A-614, A-621, and A-6092, available from ICI Resins US, Wilmington, Mass.; or an alkyl acrylate and aliphatic urethane copolymer water borne dispersion, for example NeoPac™ R-9000, available from ICI Resins US, Wilmington, Mass. In addition, an electrical discharge method, such as a corona or plasma treatment, can be used to further improve the adhesion of tie-layer to the body layer.

Colorants, UV absorbers, light stabilizers, free radical scavengers or antioxidants, processing aids such as anti-blocking agents, releasing agents, lubricants, and other additives may be added to the body portion or cube-corner elements. The particular colorant selected, of course, depends on the desired color of the sheeting. Colorants typically are added at about 0.01 to 0.5 weight percent. UV absorbers typically are added at about 0.5 to 2.0 weight percent. Examples of UV absorbers include derivatives of benzotriazole such as Tinuvin™ 327, 328, 900, 1130, Tinuvin-P™, available from Ciba-Geigy Corporation, Ardsley, N.Y.; chemical derivatives of benzophenone such as Uvinul™-M40, 408, D-50, available from BASF Corporation, Clifton, N.J.; Syntase™ 230, 800, 1200 available from Neville-Synthese Organics, Inc., Pittsburgh, Pa.; or chemical derivatives of diphenylacrylate such as Uvinul™-N35, 539, also available from BASF Corporation of Clifton, N.J. Light stabilizers that may be used include hindered amines, which are typically used at about 0.5 to 2.0 weight percent. Examples of hindered amine light stabilizers include Tinuvin™-144, 292, 622, 770, and Chimassorb™-944 all available from the Ciba-Geigy Corp., Ardsley, N.Y. Free radical scavengers or antioxidants may be used, typically, at about 0.01 to 0.5 weight percent. Suitable antioxidants include hindered phenolic resins such as Irganox™-1010, 1076, 1035, or MD-1024, or Irgafos™-168, available from the Ciba-Geigy Corp., Ardsley, N.Y. Small amount of other processing aids, typically no more than one weight percent of the polymer resins, may be added to improve the resin's processibility. Useful processing aids include fatty acid esters, or fatty acid amides available from Glyco Inc., Norwalk Conn., metallic stearates available from Henkel Corp., Hoboken, N.J., or Wax E™ available from Hoechst Celanese Corporation, Somerville, N.J.

Cube-corner retroreflective sheeting in accordance with the embodiment depicted in FIG. 4 may be made by: (a) forming a structured surface comprising a plurality zones of cube-corner element arrays in accordance with FIG. 1 from a light transmissible material having an elastic modulus greater than $16 \times 10^8$ pascals; and (b) securing a body layer to the plurality of cube-corner element arrays, wherein the body layer includes a light transmissible material having an elastic modulus less than $7 \times 10^8$ pascals. Steps (a) and (b) can be carried out according to a variety of known (or later discovered) methods for making cube-corner sheeting, see, for example, U.S. Pat. Nos. 3,689,346, 3,811,983, 4,332,847, and 4,601,861, with the exception of using a high elastic modulus polymer to form the cube-corner elements and a low elastic modulus polymer to form the body layer. The body layer may be secured directly to the base of the cube-corner elements, or it may be secured to the cube-corner elements by a land layer. As indicated above, the land layer preferably is kept to a minimal thickness and preferably is made from a high elastic modulus material.

Figure 5:
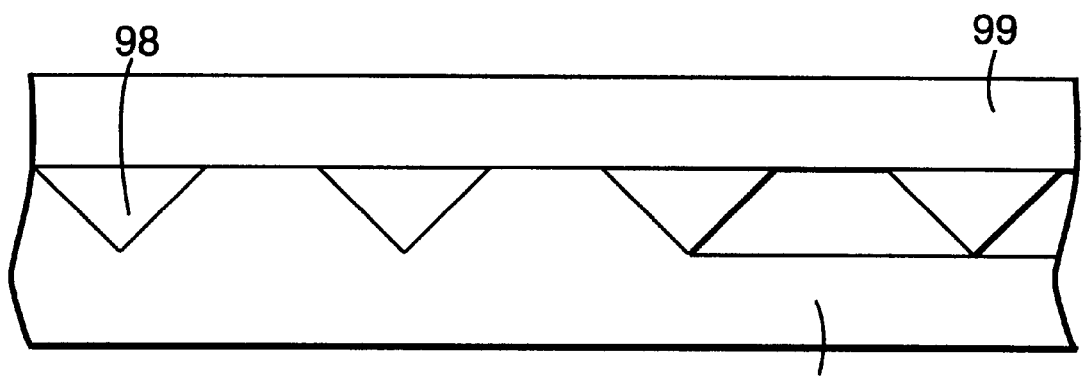
FIG. 5 is a cross-sectional view of a second embodiment of retroreflective sheeting in accordance with principles of the present invention.

FIG. 5 is a cross-sectional schematic depiction of an embodiment of the present invention manufactured in accordance with principles of the invention disclosed in U.S. Pat. No. 5,691,846, the disclosure of which is incorporated herein by reference. The embodiment depicted in FIG. 5 is also designed to be a highly flexible retroreflective sheeting suitable for conforming to corrugated and/or flexible surfaces.

In brief summary, microstructured composite sheeting (e.g., retroreflective composite cube corner sheeting) in accordance with the embodiment disclosed in FIG. 5 comprise: (a) a plurality of two dimensional arrays of substantially independent microstructure elements 98 (e.g., cube corner element arrays), and (b) an overlay film 99 having two major surfaces, the array being bonded to the first major surface of the overlay film and having zero to minimal land as described below. The embodiment depicted in FIG. 5 also illustrates a sealing film 97 fused with portions of base layer 99. The cube corner element arrays comprises a first, relatively rigid, polymeric material and the overlay film comprises a second, relatively more flexible polymeric material as described below. The microstructure elements are preferably cured in situ on the overlay film and the material of the cube corner elements and material of the overlay film preferably form an interpenetrating network.

The present method can be practiced using retroreflective elements of a variety of sizes and shapes, such as truncated cube corner elements or full cube corner elements with rectangular or non-rectangular outlines in plane view, such as hexagons. The base edges of adjacent truncated cube corner elements in an array are typically coplanar. The base edges of adjacent full cube corner elements in an array are not all in the same plane. The full cube corner elements have a height of about 20 micrometers to about 500 micrometers, and more preferably about 60 micrometers to about 180 micrometers.

Figure 6:
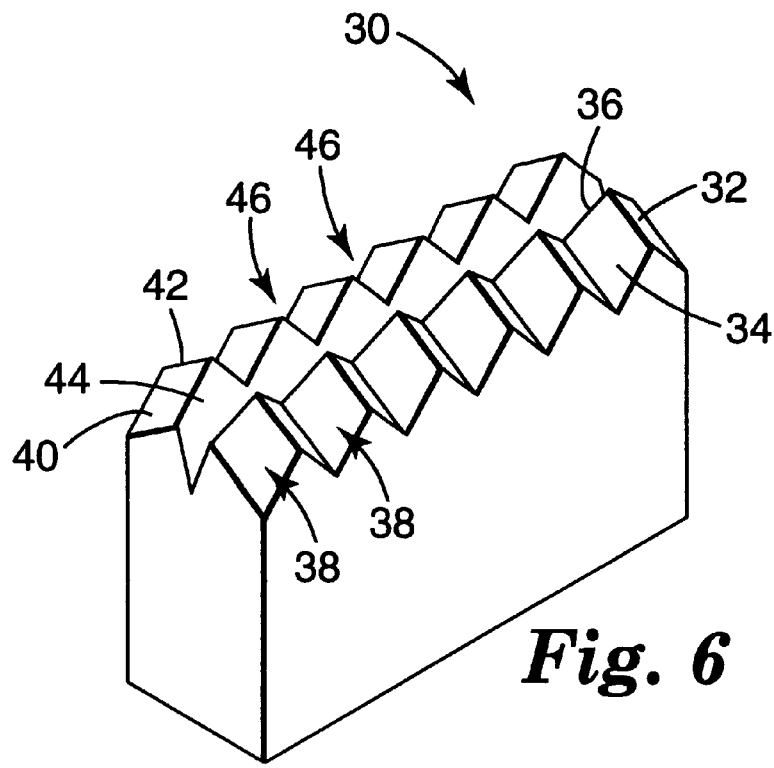
FIG. 6 is a perspective view of an exemplary lamina containing a plurality of full cube corner elements.
Figure 7:
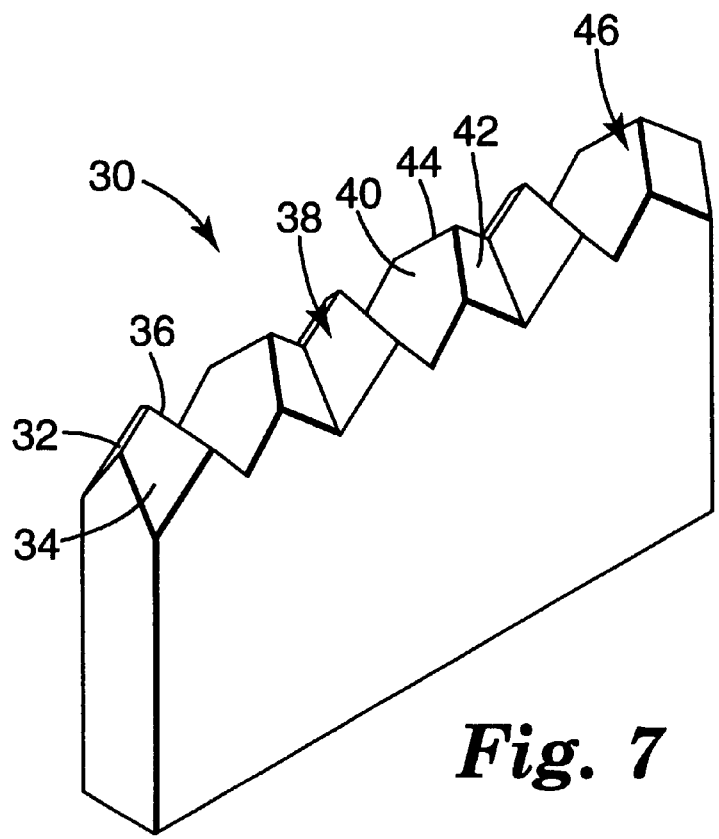
FIG. 7 is a perspective view of an alternate exemplary lamina containing a plurality of full cube corner elements.

FIGS. 6 and 7 disclose two exemplary embodiments of lamina 30 containing full cube corner elements 38, 46. The lamina 30 is machined to have three mutually perpendicular optical faces 32, 34, 36 to form a full cube corner elements 38. Similarly, the three optical faces 40, 42, 44 are machined to form full cube corner elements 46. A plurality of such lamina may be arranged to form a mold defining first and second zones of cube corner elements according to FIG. 1. Preferably, cube corner elements used for the sheeting 10 according to FIG. 1 may be combined or tiled with cube corner elements of the same size, shape and optical performance.

The cube corner elements 38, 46 are preferably opposing pairs that generate mirror image retroreflection patterns. The cube corner element opposing pairs need not be physically adjacent to each other. It is possible for opposing pairs to be physically separated on the retroreflective article. For example, as disclosed in U.S. patent application entitled Retroreflective Cube Corner Sheeting Mold and Method for Making the Same (U.S. Ser. No. 08/887,074), it is possible to prepare an array of full cube corner elements with symmetry axes or optical axes that are generally parallel.

Figure 8:
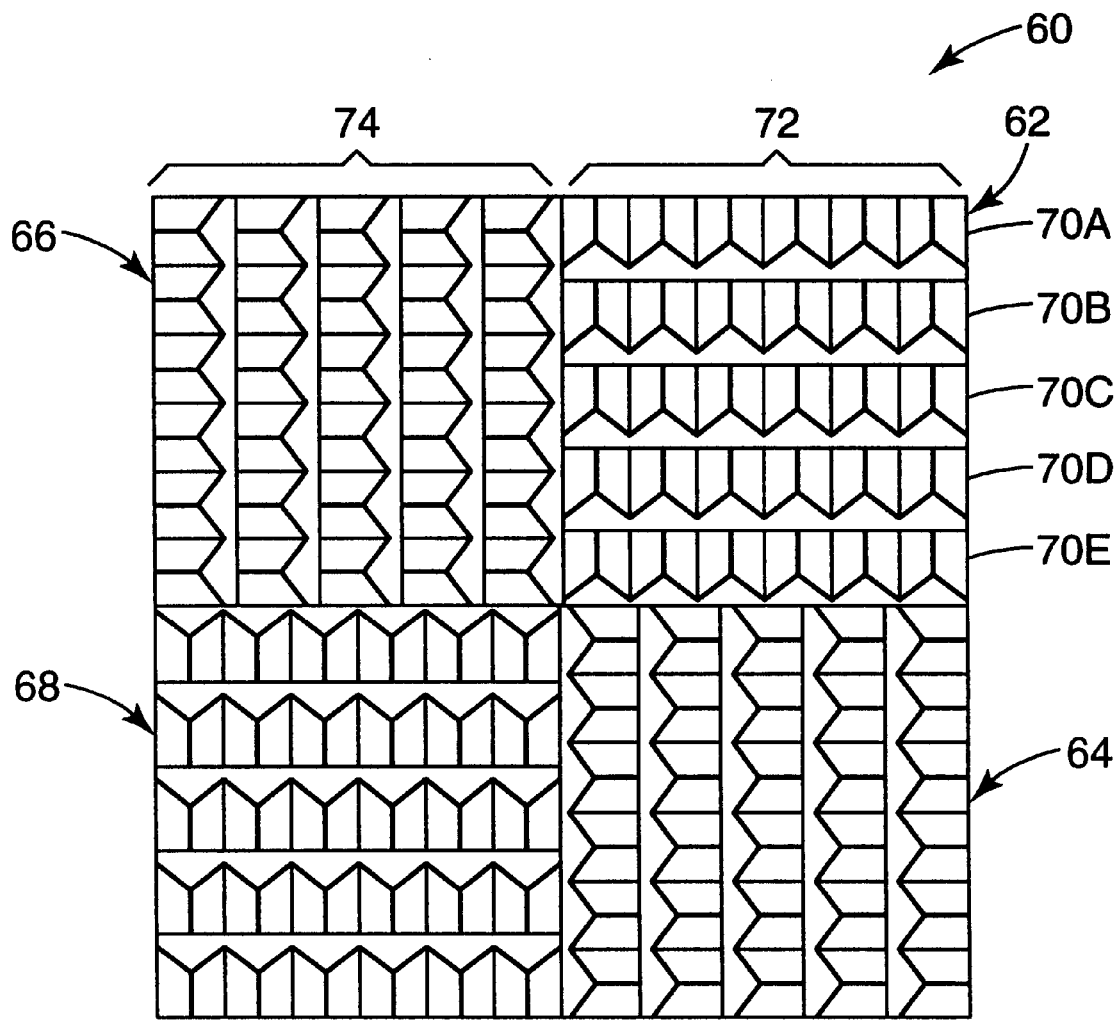
FIG. 8 is a plan view illustrating the structured surface of an alternate embodiment of retroreflective sheeting in accordance with principles of the present invention.

FIG. 8 illustrates a first array 62 of laminae 70a, 70b, 70c, 70d, 70e containing full cube corner elements with generally parallel symmetry axes. The total light return for the array 62 of aligned cube corner elements would be asymmetrical about a 360° range of orientation angles. A second array 68 of full cube corner elements with parallel symmetry axes is arranged in an optically opposing configuration with the first array 62 to produce the first primary plane of improved retroreflective performance. The second array 68 can be physically off-set from the first array 62 as long as the symmetry axes of the first and second arrays are in substantially the same plane so as to produce optically opposing cube corner elements. The first array 62 is located in a first zone 72 on the retroreflective article 60 and the second array 68 is located in a second zone 74.

Similarly, third and forth arrays 64, 66 of laminae containing full cube corner elements with parallel symmetry axes are arranged in an optically opposing configuration to produce the second primary plane of improved retroreflective performance. The third array 64 is not necessarily physically adjacent to the fourth array 66 as long as the symmetry axes of the third and fourth arrays are in the same plane so as to produce optically opposing matched pairs. The third and fourth arrays 64, 66 can be located in one or more zones 72, 74 on the retroreflective article 60. Alternatively, the first and second arrays 62, 68 can be located in a single zone. The resulting retroreflective article 60 with four arrays 62, 64, 66, 68 of cube corner elements would exhibit substantially similar retroreflective performance at varying entrance angles in each of the two perpendicular primary planes, generally according to the embodiment of FIGS. 1 and 3.

Related applications disclosing additional full and truncated cube corner structures, filed on the same date herewith include: Retroreflective Cube Corner Sheeting Mold and Method for Making the Same (U.S. Ser. No. 08/886,074); Cube Corner Sheeting Mold and Method Making the Same (U.S. Ser. No. 08/886,074); Retroreflective Cube Corner Sheeting Mold and Sheeting Formed Therefrom (U.S. Ser. No. 08/886,998); Retroreflective Cube Corner Sheeting, Molds Therefore, and Methods of Making the Same (U.S. Ser. No. 08/887,390); and Tiled Retroreflective Sheeting Composed of Highly Canted Cube Corner Elements (U.S. Ser. No. 08/887,389).

Briefly summarizing, retroreflective sheeting in accordance with the embodiment depicted in FIG. 5 is manufactured by a method which comprises the steps of:

a) providing a tool having a molding surface with a plurality of cavities opening thereon suitable for forming desired microstructure elements (e.g., cube corner elements of a retroreflective article);

b) applying to the molding surface of the tool a volume of a flowable curable resin composition suitable for forming microstructure elements (e.g., retroreflective cube corner elements), the resin preferably being such that it shrinks when cured;

c) contacting the resin composition with a first major surface of an overlay film having first and second major surfaces; and d) minimizing, preferably uniformly, excess resin composition extending above the cavities and tool then e) curing the resin composition to form a composite sheeting comprising an array of microstructure elements (e.g., cube corner elements) bonded to the overlay film; then f) removing the sheeting from the tool; and g) applying mechanical stress to the sheeting so as to cause a fractured separation of substantially each individual microstructure element from surrounding microstructure elements, if they were connected by a land. The resin composition and overlay film are preferably such that when the resin composition contacts the overlay film it penetrates the overlay film so that after the primary curing treatment an interpenetrating network between the material of the microstructure elements and the material of the overlay film is formed.

The resin composition and overlay film are preferably such that when the resin composition contacts the overlay film it penetrates the overlay film so that after the primary curing treatment an interpenetrating network between the material of the cube corner elements and the material of the overlay film is formed.

A variety of techniques and methods have been developed for fabrication of cube corner type retroreflective articles. Any suitable technique for forming a desired array of cube corner elements, for example, pin bundling techniques and direct machining techniques, replication, etc. can be used to form the tool with appropriate molding surface, i.e., having a plurality of cavities, for use in the present invention.

The tool should be such that the cavities will not deform undesirably during fabrication of the composite article, and such that the array of cube corner elements can be separated therefrom after curing. Illustrative examples of substrates known to be useful for forming tools for replication of cube corner elements include materials that can be directly machined. Such materials preferably machine cleanly without burr formation, exhibit low ductility and low graininess, and maintain dimensional accuracy after groove formation. A variety of machinable plastics (including both thermoset and thermoplastic materials), e.g., acrylics, and machinable metals, preferably nonferrous, e.g., aluminum, brass, copper, and nickel are known. In many instances, it may be desired to use a first or later generation replicate of a machined or shaped surface as the tool (i.e., the member on which the cube corner sheeting of the invention is formed). Depending upon the tool used and the nature of the resin composition, the cured array may separate from the tool readily or a parting layer may be necessary to achieve desired separation characteristics. Illustrative examples of parting layer materials include an induced surface oxidation layer, an intermediate thin metallic coating, chemical silvering, combinations of different materials or coatings. If desired, suitable agents may be incorporated into the resin composition to achieve desired separation characteristics.

As discussed above, the tool can be made from polymeric, metallic, composite, or ceramic materials. In some embodiments, curing of the resin will be performed by applying radiation through the tool. In such instances, the tool should be sufficiently transparent to permit irradiation of the resin therethrough. Illustrative examples of materials from which tools for such embodiments can be made to include polyolefins and polycarbonates. Metal tools are typically preferred, however, as they can be formed in desired shapes and provide excellent optical surfaces to maximize retroreflective performance of a given cube corner element configuration.

A flowable resin is applied to the molding surface of the tool. The resin should be such that it flows, optionally with applied vacuum, pressure, or mechanical means, into the cavities in the molding surface. It is preferably applied in sufficient quantity that it at least substantially fills the cavities.

Critical to the practice of the invention is selection of appropriate polymeric materials for the cube corner element array and overlay film. Typically the array of cube corner elements preferably comprises a material that is thermoset or extensively crosslinked, and the overlay film preferably comprises a thermoplastic material. The superior chemical and mechanical properties of thermoset materials yield cube corner elements optimally capable of maintaining desired retroreflectivity.

In choosing the polymeric components of composite retroreflective materials of the present invention, it is essential to select compatible polymeric materials for the cube corner elements and overlay film. A preferred aspect of compatibility is that the material of the resin composition be capable of penetrating the overlay film and then cure in situ such that after curing an interpenetrating network between the material of the cube corner elements and the material of the overlay film is formed. A surprising aspect of this invention is that efficient optical performance can be obtained with such interpenetrating networks of bond between the cube corner elements and overlay film. Particular resin compositions and overlay films can be readily screened for penetration by application of a quantity of the resin composition to the surface of the overlay film. Priola, A., Gozzelino, G., and Ferrero, F., *Proceedings of the XIII International Conference in Organic Coatings Science and Technology,* Athens, Greece, Jul. 7–11, 1987, pp. 308–18, discloses a watch glass test suitable for this purpose.

A critical criterion in the selection of these components is the relative elastic modulus for each component. The term "elastic modulus" as used herein means the elastic modulus determined according to ASTM D882-75b using Static Weighing Method A with a 12.5 centimeter (5 inch) initial grip separation, a 2.5 centimeter (1 inch) sample width, and a 2.5 centimeter/minute (1 one inch/minute) rate of grip separation. As discussed above in relation to the fundamental principles behind the optical properties of cube corner elements, even slight distortion of the geometry of cube corner elements can result in substantial degradation of optical properties of the cube corner elements. Thus, higher elastic modulus materials are preferable for the cube corner elements due to their increased resistance to distortion. The overlay film of the composite retroreflective materials of the invention is preferably a polymeric material of somewhat lower elastic modulus. During the course of fabrication of the overlay film/cube corner array composite, individual cube corner elements bond to the overlay film. During curing of the cube corner component, depending on the composition of the cube corner material, individual cube corner elements may experience a certain degree of shrinking. If the elastic modulus of the overlay film is too high, torsional stresses can be applied to the cube corner elements if they shrink during curing. If the stresses are sufficiently high, then the cube corner elements can become distorted with a resulting degradation in optical performance. When the elastic modulus of the overlay film is sufficiently lower than the modulus of the cube corner element material, the overlay film can deform along with the shrinking of cube corner elements without exerting such deformational stresses on the cube corner elements that would lead to undesirable degradation of the optical characteristics.

Alternatively, the differential between the elastic modulus of the cube corner element and the overlay material need not be as great depending on the dimensions of the cube corner elements. When the cube corner elements are of lower height, the differential between the elastic modulus of the cube corner elements and the overlay film need not be as great, presumably because the smaller cube corner elements do not undergo as great a shrinkage during curing, as measured in absolute dimensional units, and the overlay film does not interact with the cube corner elements toward creation of torsional and dimensional stresses to as great an extent as with larger cube corner elements. In general, it is possible to state that the modulus differential between the overlay film and the cube corner elements should be on the order of 1.0 to $1.5 \times 10^7$ pascals or more. As the height of the cube corner elements diminishes, it is possible for this modulus differential to reach the low end of the range given immediately above. However, it should be kept in mind that there is a practical lower limit to the modulus of the cube corner element material. Below a certain level, generally on the order of about 2.0 to $2.5 \times 10^8$ pascals for cube corner elements about 175 microns (7 mils) in height, less for smaller cube corner elements, the cube corner elements become too flexible and do not possess sufficient mechanical rigidity to properly fracture upon application of a stress. The cube corner elements preferably have an elastic modulus of greater than about $25 \times 10^8$ pascals. Without such fracturing, the decoupling of the individual cube corner elements that is essential to the flexibility and the superior optical properties of the sheeting under stress cannot be reliably attained.

Aside from considerations concerning the relative elastic modulus between the cube corner elements and overlay film, there is a requirement of relatively low elastic modulus for the overlay film that is essential to achieve the desired degree of ultra-flexibility in the resulting composite retroreflective sheeting. As detailed above, the array of cube corner elements is formed with a minimal amount of land. Provided that the land can be sufficiently minimized, stretching or other suitable elastic distortion of the overlay film results in fracture of the land. This can be accomplished by application of elastic stress to the overlay film/cube corner array composite post-fabrication, or can result from the process of simply removing the composite sheeting from the fabrication apparatus. This represents considerable efficiency in fabrication in that significant post-casting operations to fracture more substantial lands to achieve the same effect are unnecessary, with resulting savings in fabrication costs.

After curing, the thickness of the land, i.e., the thickness of the cube corner array material opposite the plane defined by the bases of the cube corner elements, is preferably less than 10 percent of the height of the cube corner elements, and more preferably less than 1 percent thereof In sheeting having thicker land portions, it is typically more difficult to achieve decoupling of individual cube corner elements, thereby rendering the resultant product less flexible, or to achieve decoupling without damaging the material in substantial portions of the bases of the cubes, thereby reducing the retroreflective performance of the resultant sheeting. In addition, if the land is too thick, there may be a tendency for cracks to propagate across the base of the cube corner elements, thereby reducing the optical performance of the sheeting, rather than between individual cube corner elements as desired for decoupling of the elements. Thickness of the land can be controlled by controlling the amount of flowable resin composition applied to the tool, removing excess resin composition, e.g., with a doctor blade, applying pressure to the overlay film so as to squeeze out excess composition, etc.

The resin composition is preferably one that will shrink upon curing. Preferably the resin will shrink at least 5 percent by volume when cured, more preferably between 5 and 20 percent by volume, when cured. It has been found that by using resin compositions of this type in accordance with the invention, cube corner arrays with minimal or no land thickness can be more easily formed, thereby achieving the high flexibility which is desired. For instance, resin compositions that shrink when cured will tend to retreat into the cube corner-shaped cavity, tending to leave a land that only connects adjacent cavities and therefor adjacent cube corners with a narrow portion if applied to the tool in appropriate quantities. The narrow portion is readily broken resulting in decoupling of individual cube corner elements as discussed below. Sheeting of the invention can in theory be formed with essentially no land connecting adjacent cube corner elements, however, in typical high volume manufacturing arrangements, a minimal land having a thickness of up to 10 percent of the height of the cubes, preferably on the order of 1 to 5 percent, will be formed.

Resins selected for use in the array of cube corner elements preferably yield resultant products that provide highly efficient retroreflection as well as sufficient durability and weatherability. Illustrative examples of suitable polymers include acrylic, polycarbonate, polyester, polyethylene, polyurethane, and cellulose acetate butyrate polymers. Polymers such as poly(carbonate), poly (methylmethacrylate), polyethylene terephthalate, aliphatic polyurethane, and cross-linked acrylate such as mono- or multi-functional acrylates or acrylated epoxies, acrylated polyesters, and acrylated urethanes blended with mono- and multi-functional monomers are typically preferred. These polymers are typically preferred for one or more of the following reasons: high thermal stability, environmental stability, and clarity, excellent release from the tooling or mold, and high receptivity for receiving a reflective coating.

Other illustrative examples of materials suitable for forming the array of cube corner elements are reactive resin systems capable of being cross-linked by a free radical polymerization mechanism by exposure to actinic radiation, for example, electron beam, ultraviolet light, or visible light. Additionally, these materials may be polymerized by thermal means with the addition of a thermal initiator such as benzoyl peroxide. Radiation-initiated cationically polymerizable resins also may be used. Reactive resins suitable for forming the array of cube corner elements may be blends of photoinitiator and at least one compound bearing an acrylate group. Preferably the resin blend contains a monofunctional, a difunctional, or a polyfunctional compound to ensure formation of a cross-linked polymeric network upon irradiation.

Illustrative examples of resins that are capable of being polymerized by a free radical mechanism that can be used herein include acrylic-based resins derived from epoxies, polyesters, polyethers, and urethanes, ethylenically unsaturated compounds, aminoplast derivatives having at least one pendant acrylate group, isocyanate derivatives having at least one pendant acrylate group, epoxy resins other than acrylated epoxies, and mixtures and combinations thereof The term acrylate is used here to encompass both acrylates and methacrylates. U.S. Pat. No. 4,576,850 (Martens) discloses examples of crosslinked resins that may be used in cube corner element arrays of the present invention.

Ethylenically unsaturated resins include both monomeric and polymeric compounds that contain atoms of carbon, hydrogen and oxygen, and optionally nitrogen, sulfur, and the halogens may be used herein. Oxygen or nitrogen atoms, or both, are generally present in ether, ester, urethane, amide, and urea groups. Ethylenically unsaturated compounds preferably have a molecular weight of less than about 4,000 and preferably are esters made from the reaction of compounds containing aliphatic monohydroxy groups, aliphatic polyhydroxy groups, and unsaturated carboxylic acids, such as acrylic acid, methacrylic acid, itaconic acid, crotonic acid, iso-crotonic acid, maleic acid, and the like. Such materials are typically readily available commercially and can be readily cross linked.

Some illustrative examples of compounds having an acrylic or methacrylic group that are suitable for use in the invention are listed below:

(1) Monofunctional Compounds

Ethylacrylate, n-butylacrylate, isobutylacrylate, 2-ethylhexylacrylate, n-hexylacrylate, n-octylacrylate, isooctyl acrylate, bornyl acrylate, tetrahydrofurfuryl acrylate, 2-phenoxyethyl acrylate, and N,N-dimethylacrylamide;

(2) Difunctional Compounds 1,4-butanediol diacrylate, 1,6-hexanediol diacrylate, neopentylglycol diacrylate, ethylene glycol diacrylate, triethyleneglycol diacrylate, tetraethylene glycol diacrylate, and diethylene glycol diacrylate; and (3) Polyfunctional Compounds Trimethylolpropane triacrylate, glyceroltriacrylate, pentaerythritol triacrylate, pentaerythritol tetraacrylate, and tris (2-acryloyloxyethyl)isocyanurate.
Monofunctional compounds typically tend to provide faster penetration of the material of the overlay film and difunctional and polyfunctional compounds typically tend to provide more crosslinked, stronger bonds at the interface between the cube corner elements and overlay film. Some representative examples of other ethylenically unsaturated compounds and resins include styrene, divinylbenzene, vinyl toluene, N-vinyl formamide, N-vinyl pyrrolidone, N-vinyl caprolactam, monoallyl, polyallyl, and polymethallyl esters such as diallyl phthalate and diallyl adipate, and amides of carboxylic acids such as N,N-diallyladipamide.

Illustrative examples of photopolymerization initiators that can be blended with acrylic compounds in cube corner arrays of the present invention include the following: benzil, methyl o-benzoate, benzoin, benzoin ethyl ether, benzoin isopropyl ether, benzoin isobutyl ether, etc., benzophenone/ tertiary amine, acetophenones such as 2,2-diethoxyacetophenone, benzyl methyl ketal, 1-hydroxycyclohexylphenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, 2,4,6-trimethylbenzoyldiphenylphosphine oxide, 2-methyl-1-4 (methylthio), phenyl-2-morpholino-1-propanone, bis(2,6-dimethoxybenzoyl)(2,4,4-trimethylpentyl)phosphine oxide, etc. The compounds may be used individually or in combination.

Cationically polymerizable materials including but are not limited to materials containing epoxy and vinyl ether functional groups may be used herein. These systems are photoinitiated by onium salt initiators, such as triarylsulfonium, and diaryliodonium salts.

Preferably, the overlay film 99 used in the method of the present invention is a polymeric material selected from the group consisting of ionomeric ethylene copolymers, plasticized vinyl halide polymers, acid functional polyethylene copolymers, aliphatic polyurethanes, aromatic polyurethanes, other light transmissive elastomer, and combinations thereof Such materials typically provide overlay films that are impart desired durability and flexibility to the resultant retroreflective sheeting while permitting desired preferred penetration by the cube corner element resin composition.

The overlay film 99 preferably comprises a low elastic modulus polymer, e.g., less than about $13 \times 10^8$ pascals, to impart easy bending, curling, flexing, conforming, or stretching to the resultant retroreflective composite. Generally, the overlay film comprises polymer having a glass transition temperature less than about 50° C. The polymer preferably is such that the overlay film retains its physical integrity under the conditions it is exposed to as the resultant composite retroreflective sheeting is formed. The polymer desirably has a Vicat softening temperature that is greater than 50° C. The linear mold shrinkage of the polymer desirably is less than 1 percent, although certain combinations of polymeric materials for the cube corner elements and the overlay will tolerate a greater extent of shrinking of the overlay material. Preferred polymeric materials used in the overlay are resistant to degradation by UV light radiation so that the retroreflective sheeting can be used for long-term outdoor applications. The overlay film should be light transmissive and preferably is substantially transparent. For instance, films with a matte finish that become transparent when the resin composition is applied thereto, or that only become transparent during the fabrication process, e.g., in response to the curing conditions used to form the array of cube corner elements, are useful herein.

The overlay 99 film may be either a single layer or multi-layer component as desired. If multilayered, the layer to which the array of cube corner elements is bonded should have the properties described herein as useful in that regard with other layers not in contact with the array of cube corner elements having selected characteristics as necessary to impart desired characteristics to the resultant composite retroreflective sheeting.

The overlay film 99 should be sufficiently elongatable to achieve decoupling of the cube corner elements as discussed herein. It may be elastomeric, i.e., tend to recover to at least some degree after being elongated, or may have substantially no tendency to recover after being elongated, as desired. Illustrative examples of polymers that may be employed in overlay films herein include:

(1) Fluorinated polymers such as: poly(chlorotrifluoroethylene), for example KEL-F800 Brand available from Minnesota Mining and Manufacturing, St. Paul, Minn.; poly(tetrafluoroethylene-co-hexafluoropropylene), for example EXAC FEP Brand available from Norton Performance, Brampton, Mass.; poly(tetrafluoroethylene-co-perfluoro(alkyl)vinylether), for example, EXAC PEA Brand also available from Norton Performance; and poly(vinylidene fluoride-co-hexafluoropropylene), for example, KYNAR FLEX-2800 Brand available from Pennwalt Corporation, Philadelphia, Pa;

(2) ionomeric ethylene copolymers such as: poly(ethylene-co-methacrylic acid) with sodium or zinc irons such as SURLYN-8920 Brand and SURLYN-9910 Brand available from E.I. duPont Nemours, Wilmington, Del.;

(3) Low density polyethylenes such as: low density polyethylene; linear low density polyethylene; and very low density polyethylene;

(4) Plasticized vinyl halide polymers such as plasticized poly(vinychloride);

(5) Polyethylene copolymers including: acid functional polymers such as poly(ethylene-co-acrylic acid) and poly(ethylene-co-methacrylic acid) poly(ethylene-co-maleic acid), and poly(ethylene-co-fumaric acid); acrylic functional polymers such as poly(ethylene-co-alkylacrylates) where the alkyl group is methyl, ethyl, propyl, butyl, et cetera, or $CH_3(CH_2)n$— where n is 0 to 12, and poly(ethylene-co-vinylacetate); and (6) Aliphatic and aromatic polyurethanes derived from the following monomers (1)–(3): (1) diisocyanates such as dicyclohexylmethane-4,4'-diisocyanate, isophorone diisocyanate, 1,6-hexamethylene diisocyanate, cyclohexyl diisocyanate, diphenylmethane diisocyanate, and combinations of these diisocyanates, (2) polydiols such as polypentyleneadipate glycol, polytetramethylene ether gylcol, polycaprolactonediol, poly-1,2-butylene oxide glycol, and combinations of these polydiols, and (3) chain extenders such as butanediol and hexanediol. Commercially available urethane polymers include: PN-03, or 3429 from Morton International Inc., Seabrook, N.H.

Combinations of the above polymers also may be employed in the overlay film. Preferred polymers for the overlay film include: the ethylene copolymers that contain units that contain carboxyl groups or esters of carboxylic acids such as poly(ethylene-co-acrylic acid), poly(ethylene-co-methacrylic acid), poly(ethylene-co-vinylacetate); the ionomeric ethylene copolymers; plasticized poly(vinylchloride); and the aliphatic urethanes. These polymers are preferred for one or more of the following reasons: suitable mechanical properties, good adhesions to the cube corner layer, clarity, and environmental stability.

Colorants, ultraviolet ("UV") absorbers, light stabilizers, free radical scavengers or antioxidants, processing aids such as antiblocking agents, releasing agents, lubricants, and other additives may be added to one or both of the retroreflective layer and overlay film if desired.

The resin composition and overlay film 99 are preferably such that when the resin composition contacts the overlay film it penetrates the overlay film 99 so that after the primary curing treatment an interpenetrating network between the material of the cube corner elements and the material of the overlay film 99 is formed.

If desired, the polymeric materials of the retroreflective sheeting may also contain substances such as flame retardants that optimize the overall properties of the resultant sheeting as well as articles to which it is attached.

If desired, some or all of the cube corner elements may be coated with a reflective material on the surface opposed to the overlay film 99, e.g., aluminum, silver, or dielectric materials as are known in the art of cube corner retroreflective articles. The layer of reflective material should not interfere with decoupling of the cube corner elements, i.e., it preferably readily separates at the edges of adjacent cubes. Typically as a result of the thin nature of such coatings, they do not exhibit substantial tensile strength. The reflective material may cover all of the cube corner elements in the array or only some as desired. Combinations of different reflective materials or no reflective material in different portions of the array may be used if desired.

Typically it will be desired that the composite retroreflective sheeting further comprise a sealing layer 97 adhered to the retroreflective layer on a surface opposite the overlay film such as is disclosed in U.S. Pat. No. 4,025,159. Preferably, the sealing layer 97 comprises a thermoplastic material. Illustrative examples include ionomeric ethylene copolymers, plasticized vinyl halide polymers, acid functional polyethylene copolymers, aliphatic polyurethanes, aromatic polyurethanes, and combinations thereof In certain applications, this optional sealing layer can provide significant protection for the cube corner elements of the composite material from environmental effects, as well as maintaining a sealed air layer around the cube corner elements which is essential for creating the refractive index differential needed for total internal reflection.

As a result of the decoupling of cube corner elements provided in the invention, the sealing layer 97 can be adhered, at least in part, directly to the overlay film between independent cube corner elements, typically in a pattern of sealing regions or legs thereby creating cells comprising a plurality of retroreflective cube corner elements. Illustrative examples of sealing techniques include radio frequency welding, a conductive heat sealing process, ultrasonic welding, and reactive components, e.g., a sealing material that will develop a bond to the overlay film. Selection of a sealing approach will depend in large part on the nature of the sealing layer and overlay film.

When applying a sealing layer 97 to composite retroreflective materials, whether to impart color, improved optical properties, or protection against environmental factors, considerable attention must be paid to the composition and physical properties of the individual component layers. The composition of individual component layers must be compatible with the methods used for fusing the sealing layer to the composition. Preferably, the sealing layer 97 shall comprise a thermoplastic material. Such materials lend themselves well to fusing via relatively simple and commonly available thermal techniques.

The general practice followed in the art for sealing a thermoplastic layer to a retroreflective cube corner material is to use thermal embossing techniques which result in a form of "chain link" pattern of sealed zones which create sealed pockets of a plurality of individual cube corner elements. Closer inspection of a portion of a leg or "link" of a thermally sealed area indicates that for thermoplastic cube corner elements, the thermal fusion process results in significant distortion of the cube corner elements in fusion zones. This type of thermal distortion of the sealing legs typically extends well beyond the zone of actual sealing due to conductive effects. If an appreciable number of individual cube corner elements in the material are so distributed, the overall optical properties of the sheeting can decrease significantly, e.g., 30 to 40 percent, in comparison to unsealed sheeting.

Radio frequency ("RF") welding is an alternative to thermal fusion. RF welding accomplishes fusion through the presence of polymer polar groups converting the radio frequency energy into kinetic motion which heats the polymer.

Composite retroreflective sheeting of the invention can be secured to desired substrates in a variety of ways, including mechanical and adhesive means. If adhesive is used, the adhesive is preferably applied to only a portion of the back of the sheeting so as to minimize degradation of retroreflective brightness or a sealing layer is preferably used to keep the surfaces of the cube corner elements clear for effective retroreflection.

All patent and patent applications referred to, including those disclosed in the background of the invention, are hereby incorporated by reference. The above discussion has disclosed a retroreflective sheeting having a structured surface which zones of cube corner element arrays disposed at alternating orientations such that the sheeting exhibits exactly two planes of improved retroreflective performance at increased entrance angles. Although multiple embodiments of the present invention has been illustrated and described, it will be appreciated by those of ordinary skill in the retroreflective optics arts that insubstantial changes calculated to achieve the same result may be substituted for the specific embodiments and steps disclosed above. This application is intended to cover any such adaptations or variations of the present invention. Therefore, it is intended that this invention be limited only by the appended claims and equivalents thereof.

What is claimed is:

1. A retroreflective sheeting comprising a substrate having a base surface and a structured surface opposite the base surface, the structured surface comprising a plurality of zones of cube corner elements, including:
   a first zone comprising an array of cube corner elements, the optical axes of the cube corner elements canted to define a first primary plane of improved retroreflective performance at increased entrance angles, the first primary plane extending substantially parallel with a longitudinal edge of the sheeting; and
   a second zone comprising an array of cube corner elements, the optical axes of the cube corner elements canted to define a second primary plane of improved retroreflective performance at increased entrance angles, the second primary plane being perpendicular to the first primary plane.

2. Retroreflective sheeting in accordance with claim 1, wherein the array of cube corner elements in the first zone is oriented such that the first primary plane lies substantially perpendicular to a second edge of the sheeting.

3. Retroreflective sheeting in accordance with claim 1, wherein the array of cube corner elements in the second zone is oriented such that the second primary plane lies substantially parallel to a second edge of the sheeting.

4. Retroreflective sheeting in accordance with claim 1, wherein the cube corner elements comprise truncated cube corner elements.

5. Retroreflective sheeting in accordance with claim 1, wherein the cube corner elements comprise full cube corner elements.

6. Retroreflective sheeting in accordance with claim 1, wherein the second zone extends substantially parallel with the first zone.

7. Retroreflective sheeting in accordance with claim 1, wherein the first zone measures between about 3 millimeters and 25 millimeters in width.

8. Retroreflective sheeting in accordance with claim 1, wherein the second zone measures between about 3 millimeters and 25 millimeters in width.

9. Retroreflective sheeting in accordance with claim 1, wherein the cube corner elements comprise a material having a refractive index of between 1.46 and 1.60 and the optical axes of opposing cube corner elements are canted between 7 and 15 degrees from a position perpendicular to the base surface.

10. Retroreflective sheeting in accordance with claim 1, wherein the cube corner elements comprise a material having a refractive index of about 1.5 and the optical axes of opposing cube corner elements are canted between 8 and 9.736 degrees from a position perpendicular to the base surface.

11. Retroreflective sheeting in accordance with claim 1, wherein:
   the sheeting comprises a coefficient of retroreflection of at least 16 candelas/lux/m$^2$ in response to light incident on the surface of the sheeting in the first primary plane at an entrance angle of about 60 degrees, measured at a 0.33 degree observation angle and a 90 degree presentation angle; and
   the sheeting comprises a coefficient of retroreflection of at least 16 candelas/lux/m$^2$ in response to light incident on the surface of the sheeting in the second primary plane at an entrance angle of about 60 degrees measured at a 0.33 degree observation angle and a 90 degree presentation angle.

12. Retroreflective sheeting in accordance with claim 1, wherein:
   the sheeting comprises a coefficient of retroreflection at least of about 30 candelas/lux/m$^2$ in response to light incident on the surface of the sheeting in the first primary plane at an entrance angle of about 60 degrees, measured at a 0.33 degree observation angle and a 90 degree presentation angle; and
   the sheeting comprises a coefficient of retroreflection of at least about 30 candelas/lux/m$^2$ in response to light incident on the surface of the sheeting in the second primary plane at an entrance angle of about 60 degrees measured at a 0.33 degree observation angle and a 90 degree presentation angle.

13. Retroreflective sheeting in accordance with claim 1, wherein:
   the sheeting comprises a coefficient of retroreflection of at least 90 candelas/lux/m$^2$ in response to light incident on the surface of the sheeting in the first primary plane at an entrance angle of about 40 degrees, measured at a 0.33 degree observation angle and a 90 degree presentation angle; and
   the sheeting comprises a coefficient of retroreflection of at least 90 candelas/lux/m$^2$ in response to light incident on the surface of the sheeting in the second primary plane at an entrance angle of about 40 degrees measured at a 0.33 degree observation angle and a 90 degree presentation angle.

14. Retroreflective sheeting in accordance with claim 1, wherein:

the sheeting comprises a coefficient of retroreflection of at least about 150 candelas/lux/m² in response to light incident on the surface of the sheeting in the first primary plane at an entrance angle of about 40 degrees, measured at a 0.33 degree observation angle and a 90 degree presentation angle; and the sheeting comprises a coefficient of retroreflection of at least about 150 candelas/lux/m² in response to light incident on the surface of the sheeting in the second primary plane at an entrance angle of about 40 degrees measured at a 0.33 degree observation angle and a 90 degree presentation angle.

15. Retroreflective sheeting in accordance with claim 1, wherein portions of the structured surface are coated with a specularly reflective substance.

16. Retroreflective sheeting in accordance with claim 1 further comprising a sealing medium disposed adjacent the structured surface.

17. Retroreflective sheeting in accordance with claim 16 wherein the sealing medium is bonded to the substrate by a network of intersecting bonds to define a plurality of cells within which retroreflective elements are hermetically sealed.

18. Retroreflective sheeting in accordance with claim 16 wherein the sealing medium maintains an air interface with the structured surface such that the cube corner elements retroreflect according to the principles of total internal reflection.

19. Retroreflective sheeting in accordance with claim 1 wherein the substrate comprises a body portion that includes a body layer which contains a light transmissible polymeric material having an elastic modulus less than $7 \times 10^8$ pascals and the cube corner elements comprise a light transmissible polymeric material having an elastic modulus greater than $16 \times 10^8$ pascals.

20. Retroreflective sheeting in accordance with claim 19 wherein the body portion includes a land layer that has a thickness in the range of 0 to 150 micrometers and is comprised of a light transmissible polymeric material having an elastic modulus greater than $16 \times 10^8$ pascals.

21. Retroreflective sheeting in accordance with claim 20 wherein the land layer has a thickness in the range of 1 to 100 micrometers.

22. Retroreflective sheeting in accordance with claim 20 wherein the cube-corner elements and land layer comprise a polymer(s) that has an elastic modulus greater than $18 \times 10^8$ pascals.

23. Retroreflective sheeting in accordance with claim 19 wherein the body layer has a thickness of approximately 20 to 1,000 micrometers.

24. Retroreflective sheeting in accordance with claim 19 wherein the body layer has a thickness in the range of 50 to 250 micrometers.

25. Retroreflective sheeting in accordance with claim 1 wherein the cube-corner elements have a height in the range of about 60 to 180 micrometers.

26. Retroreflective sheeting in accordance with claim 1 wherein the cube-corner elements comprise a polymeric material having an elastic modulus of greater than $18 \times 10^8$ pascals.

27. Retroreflective sheeting in accordance with claim 1 wherein the cube-corner elements comprise a light transmissible polymeric material having a elastic modulus greater than $20 \times 10^8$ pascals.

28. Retroreflective sheeting in accordance with claim 1 wherein the cube-corner elements contain poly(carbonate), poly(methylmethacrylate), poly(ethyleneterephthalate), or a crosslinked acrylate.

29. Retroreflective sheeting in accordance with claim 19 wherein the body portion includes a land layer that comprises the same polymeric material as the cube-corner elements.

30. Retroreflective sheeting in accordance with claim 19 wherein the body layer contains a light transmissible polymeric material having an elastic modulus less than $5 \times 10^8$ pascals.

31. Retroreflective sheeting in accordance with claim 1 wherein the substrate comprises an overlay film comprising a first polymeric material and having two major surfaces and the cube corner elements comprise a second polymeric material and are bonded to the first major surface of the overlay film with a fractured land, the cube corner elements being substantially independent.

32. Retroreflective sheeting in accordance with claim 31 wherein the material of the cube corner elements and the material of the overlay film form an interpenetrating network.

33. Retroreflective sheeting in accordance with claim 31 wherein the land has a thickness of less than about 10 percent of the average height of the cube corner elements of the array.

34. Retroreflective sheeting in accordance with claim 31 wherein the land has a thickness of less than about 1 percent of the average height of the cube corner elements of the array.

35. Retroreflective sheeting in accordance with claim 31 further comprising a sealing layer adhered to the overlay film through openings between individual cube corner elements.

36. Retroreflective sheeting in accordance with claim 31 further comprising a reflective layer on the cube corner elements.

37. Retroreflective sheeting in accordance with claim 31 further comprising a sealing film adhered to the cube corner side of the sheeting in an interconnecting network so as form cells in which cube corner elements are encapsulated.

38. An article comprising a sheeting of claim 31 wherein the sealing film acts as the bonding.

39. An article comprising a sheeting of claim 31 attached thereto.

40. Retroreflective sheeting in accordance with claim 1 wherein:

the sheeting comprises a retroreflectance which is approximately five percent of the maximum retroreflectance in response to light incident on the surface of the sheeting in the first primary plane at an entrance angle of about 60 degrees, measured at a 0.33 degree observation angle and a 90 degree presentation angle; and the sheeting comprises a retroreflectance which is approximately five percent of the maximum retroreflectance in response to light incident on the surface of the sheeting in the second primary plane at an entrance angle of about 60 degrees measured at a 0.33 degree observation angle and a 90 degree presentation angle.

41. Retroreflective sheeting in accordance with claim I wherein:

the sheeting comprises a retroreflectance which is approximately 30 percent of the maximum retroreflectance in response to light incident on the surface of the sheeting in the first primary plane at an entrance angle of about 40 degrees, measured at a 0.33 degree observation angle and a 90 degree presentation angle; and the sheeting comprises a retroreflectance which is approximately 30 percent of the maximum retroreflectance in response to light incident on the surface of the sheeting in the second primary plane at an entrance angle of about 40 degrees measured at a 0.33 degree observation angle and a 90 degree presentation angle.

42. Retroreflective sheeting in accordance with claim 5 wherein the full cube corner elements comprise a height of about 10 micrometers to about 500 micrometers.

43. Retroreflective sheeting in accordance with claim 5 wherein the full cube corner elements comprise a height of about 25 micrometers to about 250 micrometers.

44. The sheeting of claim 1, wherein:

the retroreflective sheeting comprises substantially similar retroreflective performance in response to light incident on the sheeting across a range of entrance angles in the first primary plane and the second primary plane.

45. A retroreflective sheeting comprising a substrate having a base surface and a structured surface opposite the base surface, the structured surface comprising:

a first array of cube corner elements;

a second array of cube corner elements optically opposing the cube corner elements of the first array, the optical axes of the cube corner elements in the first and second arrays canted to define a first primary plane of improved retroreflective performance at increased entrance angles, the first primary plane extending substantially parallel with a longitudinal edge of the sheeting;

a third array of cube corner elements; and a fourth array of cube corner elements optically opposing the cube corner elements of the third array, the optical axes of the cube corner elements in the third and fourth arrays canted to define a second primary plane of improved retroreflective performance at increased entrance angles, the second primary plane being perpendicular to the first primary plane.

46. Retroreflective sheeting in accordance with claim 45 wherein the cube corner elements comprise full cube corner elements.

47. Retroreflective sheeting according to claim 45 wherein the first array is physically off-set from the second array.

48. The sheeting of claim 45, wherein:

the retroreflective sheeting comprises substantially similar retroreflective performance in response to light incident on the sheeting across a range of entrance angles in the first primary plane and the second primary plane.

* * * * *

UNITED STATES PATENT AND TRADEMARK OFFICE
CERTIFICATE OF CORRECTION

PATENT NO.    : 5,936,770
DATED         : August 10, 1999
INVENTOR(S)   : Nestegard, Susan K.

It is certified that error appears in the above-identified patent and that said Letters Patent is hereby corrected as shown below:

Column 10,
Line 3, after "thereof" insert -- . --.

Column 15,
Line 4, delete "U.S. Ser. No. 08/886,074" and insert in place thereof
-- U.S. Ser. No. 08/887,074 --.

Column 18,
Line 13, after "thereof" insert -- . --.

Column 19,
Line 21, after "thereof" insert -- . --.

Column 20,
Line 33, after "thereof" insert -- . --.

Column 22,
Line 35, after "thereof" insert -- . --.

Signed and Sealed this

Second Day of December, 2003

JAMES E. ROGAN
*Director of the United States Patent and Trademark Office*

(12) EX PARTE REEXAMINATION CERTIFICATE (9859th)
United States Patent
Nestegard et al.

(10) Number: US 5,936,770 C1
(45) Certificate Issued: *Oct. 4, 2013

(54) DUAL ORIENTATION RETROREFLECTIVE SHEETING

(75) Inventors: Susan K. Nestegard, Woodbury, MN (US); Gerald M. Benson, Woodbury, MN (US); Cheryl M. Frey, White Bear Lake, MN (US); John C. Kelliher, Oakdale, MN (US); James E. Lasch, Oakdale, MN (US); Kenneth L. Smith, White Bear Lake, MN (US); Theodore J. Szczech, Woodbury, MN (US)

(73) Assignee: 3M Innovative Properties Company, St. Paul, MN (US)

Reexamination Request:
No. 90/012,648, Sep. 14, 2012

Reexamination Certificate for:
Patent No.: 5,936,770
Issued: Aug. 10, 1999
Appl. No.: 08/887,006
Filed: Jul. 2, 1997

Certificate of Correction issued Dec. 2, 2013

( * ) Notice: This patent is subject to a terminal disclaimer.

Related U.S. Application Data

(63) Continuation-in-part of application No. 08/587,719, filed on Jan. 19, 1996, now Pat. No. 5,706,132.

(51) Int. Cl.
*G02B 5/124* (2006.01)

(52) U.S. Cl.
USPC .......................................... 359/530; 359/529

(58) Field of Classification Search
None
See application file for complete search history.

(56) References Cited

To view the complete listing of prior art documents cited during the proceeding for Reexamination Control Number 90/012,648, please refer to the USPTO's public Patent Application Information Retrieval (PAIR) system under the Display References tab.

*Primary Examiner* — Kenneth J Whittington

(57) ABSTRACT

A cube corner retroreflective sheeting construction comprising alternating zones of cube corner element arrays disposed at approximately ninety degrees orientations to provide exactly two principal plane of improved retroreflective performance in response to light incident on the sheeting at high entrance angles is disclosed. According to one embodiment the sheeting includes a body layer which has an elastic modulus less than $7 \times 10^8$ pascals and cube corner elements formed from a material which has an elastic modulus greater than $16 \times 10^8$ pascals. According to a second embodiment the sheeting includes an overlay film having two major surfaces and comprising a first polymeric material and a plurality of arrays of substantially independent cube corner elements bonded to a major surface of the overlay film having a minimal, fractured land.

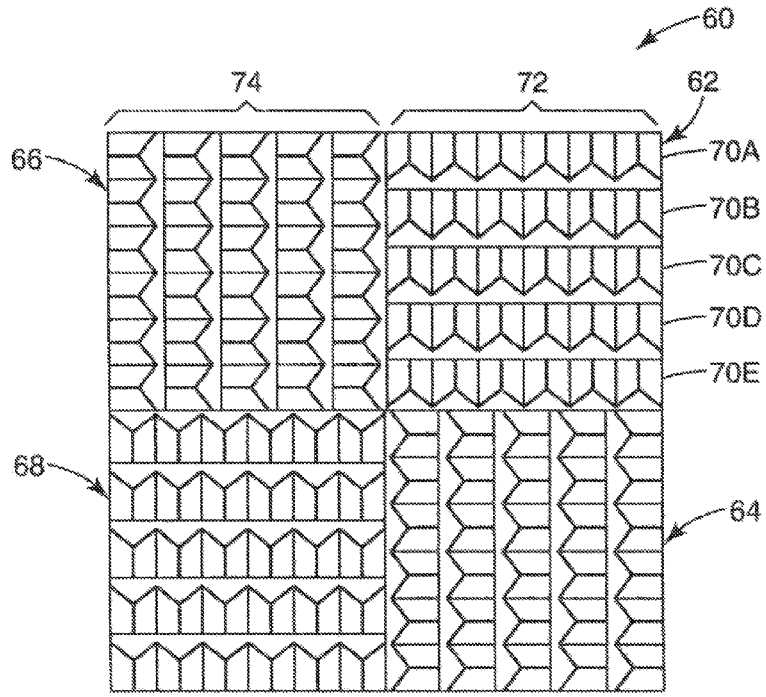

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 45-47 are determined to be patentable as amended.

Claim 48, dependent on an amended claim, is determined to be patentable.

New claims 49-70 are added and determined to be patentable.

Claims 1-44 were not reexamined.

45. A retroreflective sheeting comprising a substrate having a base surface and a structured surface opposite the surface, the structured surface comprising:
a first array of cube corner elements;
a second array of cube corner elements optically opposing the cube corner elements of the first array, the axes of the cube corner elements in the first and second arrays *being forward* canted to define a first primary plane of improved retroreflective performance at increased entrance angles, the first primary plane extending substantially parallel with a longitudinal edge of the sheeting;
a third array of cube corner elements; and
a fourth array of cube corner elements optically opposing the cube corner elements of the third array, the optical axes of the cube corner elements in the third and fourth arrays *being forward* canted to define a second primary plane of improved retroreflective performance at increased entrance angles the second primary plane being perpendicular to the first primary plane
*wherein the only primary planes of improved retroreflective performance at increased entrance angles defined by the sheeting are the first and second primary planes, the structured surface comprises a plurality of zones, each zone comprising cube corner elements having an orientation different from an orientation of cube corner elements in at least one other zone, each zone consists of a single one of the arrays, and each array comprises a plurality of rows of cube corner elements.*

46. Retroreflective sheeting in accordance with claim 45 the cube corner elements comprise full cube corner elements, *where full cube corners elements are non-truncated cube corner elements, where the base edges of adjacent full cube corner elements in an array are not all in the same plane.*

47. [Retroreflective sheeting according to claim 45] *A retroreflective sheeting comprising a substrate having a base surface and a structured surface opposite the surface, the structured surface comprising:*
*a first array of cube corner elements;*
*a second array of cube corner elements optically opposing the cube corner elements of the first array, the axes of the cube corner elements in the first and second arrays canted to define a first primary plane of improved retroreflective performance at increased entrance angles, the first primary plane extending substantially parallel with a longitudinal edge of the sheeting;*
*a third array of cube corner elements; and*
*a fourth array of cube corner elements optically opposing the cube corner elements of the third array, the optical axes of the cube corner elements in the third and fourth arrays canted to define a second primary plane of improved retroreflective performance at increased entrance angles, the second primary plane being perpendicular to the first primary plane,*
*wherein the structured surface comprises a plurality of zones, each zone comprising cube corner elements having an orientation different from an orientation of cube corner elements in at least one other zone, each zone consists of a single one of the arrays, each array comprises a plurality of rows of cube corner elements, and the first array is physically off set from the second array.*

*49. The retroreflective sheeting in accordance with claim 45 wherein the optical axis of the first and second arrays are canted to define a first secondary plane of improved retroreflective performance at increased entrance angles, the first secondary plane being orthogonal to the first primary plane.*

*50. The retroreflective sheeting in accordance with claim 49 wherein the optical axis of the third and fourth arrays are canted to define a second secondary plane of improved retroreflective performance at increased entrance angles, the second secondary plane being orthogonal to the second primary plane.*

*51. The retroreflective sheeting in accordance with claim 45 wherein each cube corner element in the first array is physically adjacent to an optically opposing cube corner element in the second array.*

*52. The retroreflective sheeting in accordance with claim 51 wherein each cube corner element in the third array is physically adjacent to an optically opposing cube corner element in the fourth array.*

*53. The retroreflective sheeting in accordance with claim 45 wherein the optical axes in the cube corner elements in the first through fourth arrays are each canted by an angle between about 7 degrees and about 15 degrees.*

*54. The retroreflective sheeting in accordance with claim 45 wherein the cube corner elements in at least one of the zones have a first orientation that is perpendicular to the orientation of the cube corner elements in at least another of the zones.*

*55. The retroreflective sheeting in accordance with claim 45 wherein at least one of the zones extends parallel to the edge of the retroreflective sheeting.*

*56. The retroreflective sheeting in accordance with claim 45 wherein the increased entrance angles comprise entrance angles up to and including 60 degrees.*

*57. The retroreflective sheeting in accordance with claim 46 wherein the full cube corner elements have rectangular outlines in plan view.*

*58. The retroreflective sheeting in accordance with claim 46 wherein the full cube corner elements have non-rectangular outlines in plan view.*

*59. The retroreflective sheeting in accordance with claim 58 wherein the full cube corner elements have hexagonal outlines in plan view.*

*60. The retroreflective sheeting in accordance with claim 46 wherein the full cube corner elements each have a height of about 20 micrometers to about 500 micrometers.*

*61. The retroreflective sheeting in accordance with claim 46 wherein the full cube corner elements each have a height of about 60 micrometers to about 180 micrometers.*

62. The retroreflective sheeting in accordance with claim 46 further comprising a layer adhered to the structured surface to maintain a sealed air layer around at least some of the cube corner elements.

63. The retroreflective sheeting in accordance with claim 46 wherein the cube corner elements reflect light via total internal reflection.

64. The retroreflective sheeting in accordance with claim 47 wherein at least one of the zones extends parallel to the edge of the retroreflective sheeting.

65. Retroreflective sheeting in accordance with claim 47 the cube corner elements comprise full cube corner elements.

66. The retroreflective sheeting in accordance with claim 65 wherein the full cube corner elements have rectangular outlines in plan view.

67. The retroreflective sheeting in accordance with claim 65 wherein the full cube corner elements have non-rectangular outlines in plan view.

68. The retroreflective sheeting in accordance with claim 67 wherein the full cube corner elements have hexagonal outlines in plan view.

69. The retroreflective sheeting in accordance with claim 65 wherein each full cube corner elements comprises base edges and the base edges of adjacent cube corner elements are not all in the same plane.

70. The retroreflective sheeting in accordance with claim 47 wherein the increased entrance angles comprise entrance angles up to and including 60 degrees.

\* \* \* \* \*